(12) United States Patent
Nishizawa

(10) Patent No.: US 11,768,159 B2
(45) Date of Patent: Sep. 26, 2023

(54) BELT EXAMINATION SYSTEM AND COMPUTER-READABLE NON-TRANSITORY RECORDING MEDIUM HAVING STORED BELT EXAMINATION PROGRAM

(71) Applicant: KYOCERA Document Solutions Inc., Osaka (JP)

(72) Inventor: Akira Nishizawa, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 337 days.

(21) Appl. No.: 17/325,528

(22) Filed: May 20, 2021

(65) Prior Publication Data

US 2021/0372937 A1    Dec. 2, 2021

(30) Foreign Application Priority Data

May 27, 2020 (JP) ................... 2020-092213

(51) Int. Cl.

| G01N 21/88 | (2006.01) |
|---|---|
| G03G 15/16 | (2006.01) |
| G06N 20/00 | (2019.01) |
| G03G 15/00 | (2006.01) |

(52) U.S. Cl.
CPC ..... *G01N 21/8851* (2013.01); *G03G 15/1615* (2013.01); *G03G 15/55* (2013.01); *G06N 20/00* (2019.01); *G01N 2021/8854* (2013.01); *G01N 2021/8887* (2013.01)

(58) Field of Classification Search
CPC ............... G01N 21/8851; G01N 21/95; G01N 2021/8887; G01N 2021/8854; G01N 2021/8874; G03G 15/1615; G03G 15/55; G06N 20/00; G06T 7/0004; G06T 7/90; G06T 7/136; G06T 2207/20081; G06T 2207/30164; G06T 5/002; G01M 13/023
USPC ...................... 356/237.1–237.5; 382/141–151
See application file for complete search history.

(56) References Cited

U.S. PATENT DOCUMENTS

| 11,493,453 B2 * | 11/2022 | Nishizawa | ......... G01N 21/8851 |
|---|---|---|---|
| 2004/0041895 A1 * | 3/2004 | Tajima | ................... H04N 1/506 347/116 |
| 2018/0357757 A1 * | 12/2018 | Kuwasako | ......... G01N 21/8851 |
| 2021/0374942 A1 * | 12/2021 | Nishizawa | .............. G06T 5/002 |

FOREIGN PATENT DOCUMENTS

JP     2012-014108     1/2012

* cited by examiner

*Primary Examiner* — Hoa Q Pham
(74) *Attorney, Agent, or Firm* — LEX IP MEISTER, PLLC

(57) ABSTRACT

A belt examination system includes a defect candidate detecting processor that detects a candidate for a belt defect that is an abnormal portion of an intermediate transfer belt of an image forming apparatus from a belt image that is an image of the intermediate transfer belt, the defect candidate detecting processor executes a background pattern reduction step to reduce a texture-pattern like background noise present in the belt image and detects the candidate based on the belt image generated during the background pattern reduction step, and the background pattern reduction step is to replace, in the belt image, a color value within a specific range of color values not including a lowest color value of the belt defect with a specific color value within the specific range.

8 Claims, 34 Drawing Sheets

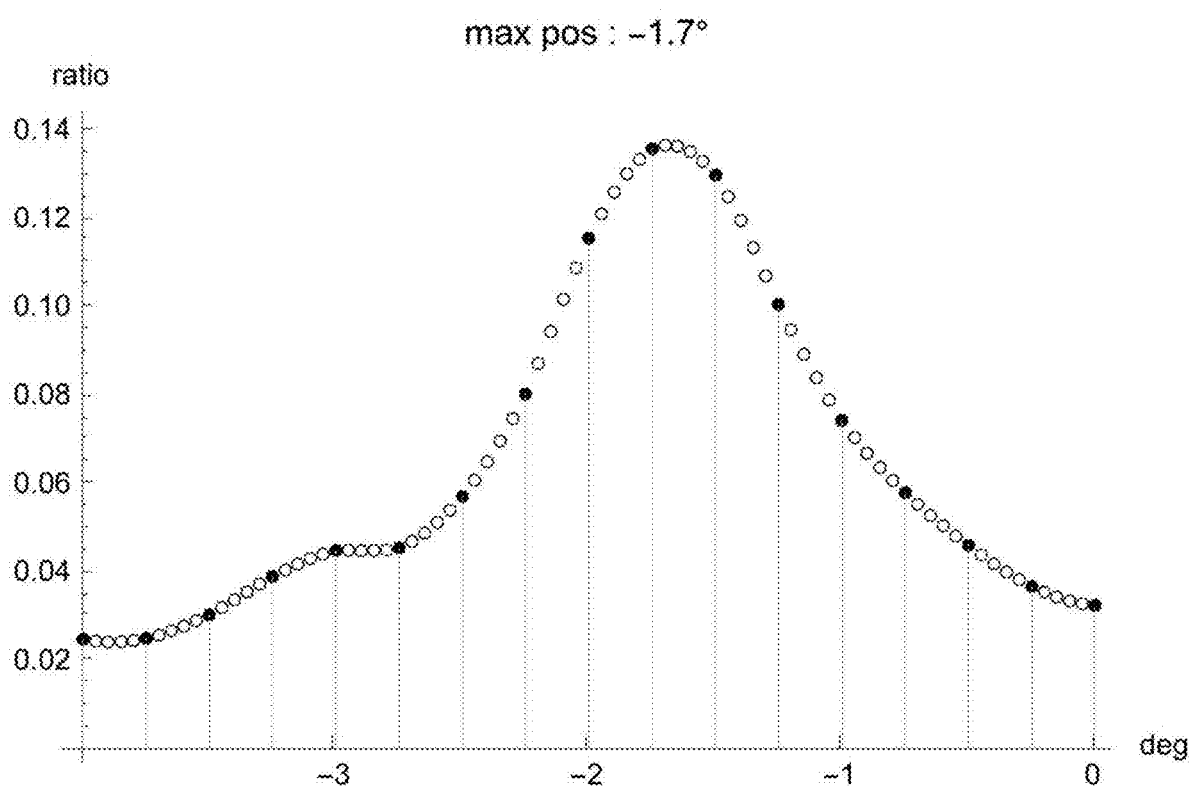

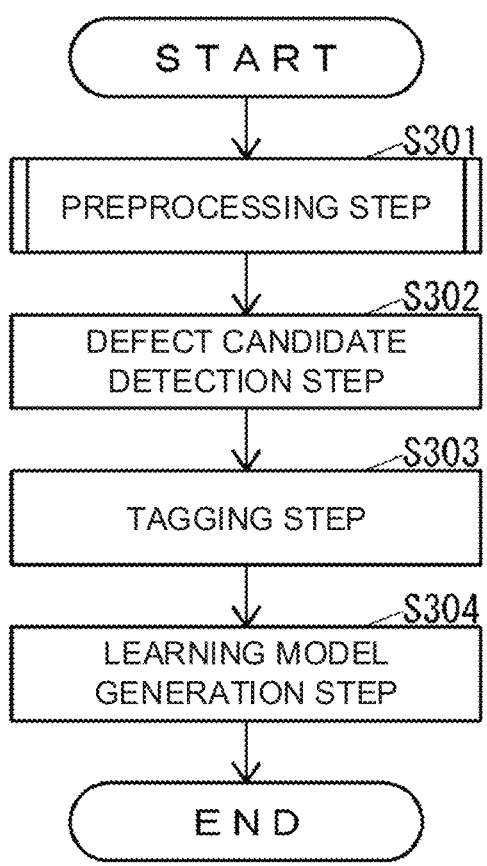

BELT EXAMINATION SYSTEM AND COMPUTER-READABLE NON-TRANSITORY RECORDING MEDIUM HAVING STORED BELT EXAMINATION PROGRAM

INCORPORATION BY REFERENCE

This application is based upon, and claims the benefit of priority from, corresponding Japanese Patent Application No. 2020-092213 filed in the Japan Patent Office on May 27, 2020, the entire contents of which are incorporated herein by reference.

BACKGROUND

Field of the Invention

The present disclosure relates to a belt examination system and a computer-readable non-transitory recording medium having stored thereon a belt examination program to detect an abnormal portion (hereinafter referred to as "belt defect") of an intermediate transfer belt of an image forming apparatus.

Description of Related Art

There is a typically known belt examination system that optically reads the surface of an intermediate transfer belt with an imaging device and automatically detects a belt defect based on a reading result.

SUMMARY

A belt examination system according to the present disclosure includes a defect candidate detecting processor that detects a candidate for a belt defect that is an abnormal portion of an intermediate transfer belt of an image forming apparatus from a belt image that is an image of the intermediate transfer belt, the defect candidate detecting processor executes a background pattern reduction step to reduce a texture-pattern like background noise present in the belt image and detects the candidate based on the belt image generated during the background pattern reduction step, and the background pattern reduction step is to replace, in the belt image, a color value within a specific range of color values not including a lowest color value of the belt defect with a specific color value within the specific range.

A computer-readable non-transitory recording medium according to the present disclosure has stored thereon a belt examination program, and the belt examination program causes a computer to implement a defect candidate detecting processor that detects a candidate for a belt defect that is an abnormal portion of an intermediate transfer belt of an image forming apparatus from a belt image that is an image of the intermediate transfer belt. The defect candidate detecting processor executes a background pattern reduction step to reduce a texture-pattern like background noise present in the belt image and detects the candidate based on the belt image generated during the background pattern reduction step. The background pattern reduction step is to replace, in the belt image, a color value within a specific range of color values not including a lowest color value of the belt defect with a specific color value within the specific range.

BRIEF DESCRIPTION OF THE DRAWINGS

FIG. 27 is a graph obtained by plotting a difference value between a maximum value and a minimum value of an average value of color values of pixels in each line with regard to each temporary correction angle during the inclination angle specifying step illustrated in FIG. 25;

FIG. 34 is a flowchart of a learning model generation step to generate a learning model used during an acceptance/rejection determination step illustrated in FIG. 7.

DETAILED DESCRIPTION

An embodiment of the present disclosure is described below with reference to the drawings.

An intermediate transfer belt according to the present embodiment is first described.

A color image forming apparatus uses a component called an intermediate transfer belt to which charged toner adheres. When the image forming apparatus is, for example, an A3-size apparatus, the intermediate transfer belt has a tubular shape having a width of for example approximately 330 mm, slightly larger than 297 mm, which is the length of an A3-size recording medium in the lateral direction, and has an outer circumferential length of for example approximately 850 mm, slightly larger than the double of 420 mm, which is the length of an A3-size recording medium in the longitudinal direction.

The intermediate transfer belt is manufactured by extrusion molding in terms of, for example, manufacturing costs, although there are several manufacturing methods. Also, in terms of manufacturing costs, the intermediate transfer belt is often manufactured by dispersing carbon in a resin and adjusting the electrical resistance in a semiconductor region. When the intermediate transfer belt is manufactured by dispersing carbon in a resin, the intermediate transfer belt often has a dark appearance in terms of a color value in black, blackish brown, or the like.

The intermediate transfer belt is an electronically very delicate component which the charged toner repeatedly adheres to and removes from and is very sensitive to, in particular, surface protrusions, scratches, and deformations. For example, even the occurrence of a deformation having a diameter of several mm and a height of a dozen μm on the surface of the intermediate transfer belt affects the adhesion state of the toner and, as a result, reduces the quality of the image printed on a recording medium by the image forming apparatus.

Therefore, there is a need for the capability to detect a belt defect, which is an abnormal portion of the intermediate transfer belt, with high accuracy. Here, the belt defect often has a diameter of approximately 2 mm to 3 mm and a height of approximately 10 μm to 30 μm.

Next, a belt examination step to examine the intermediate transfer belt is described.

Figure 1:
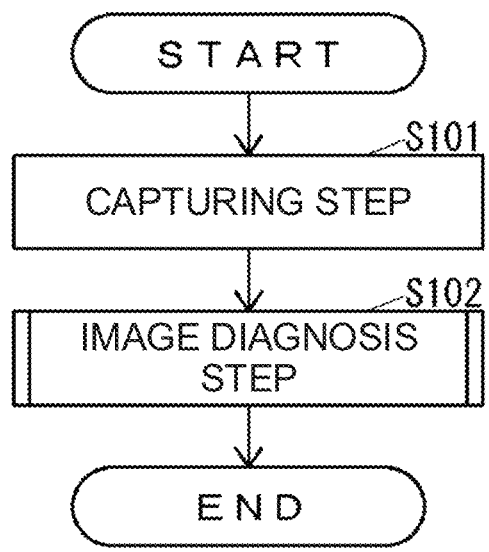
FIG. 1 is a flowchart of a belt examination step according to an embodiment of the present disclosure.

FIG. 1 is a flowchart of the belt examination step according to the present embodiment.

As illustrated in FIG. 1, the abnormality diagnosis of the intermediate transfer belt with images includes a capturing step (S101) to capture the intermediate transfer belt and an image diagnosis step (S102) to diagnose an abnormality of the intermediate transfer belt based on the image (hereinafter referred to as "belt image") of the intermediate transfer belt obtained during the capturing step at S101.

Figure 2:
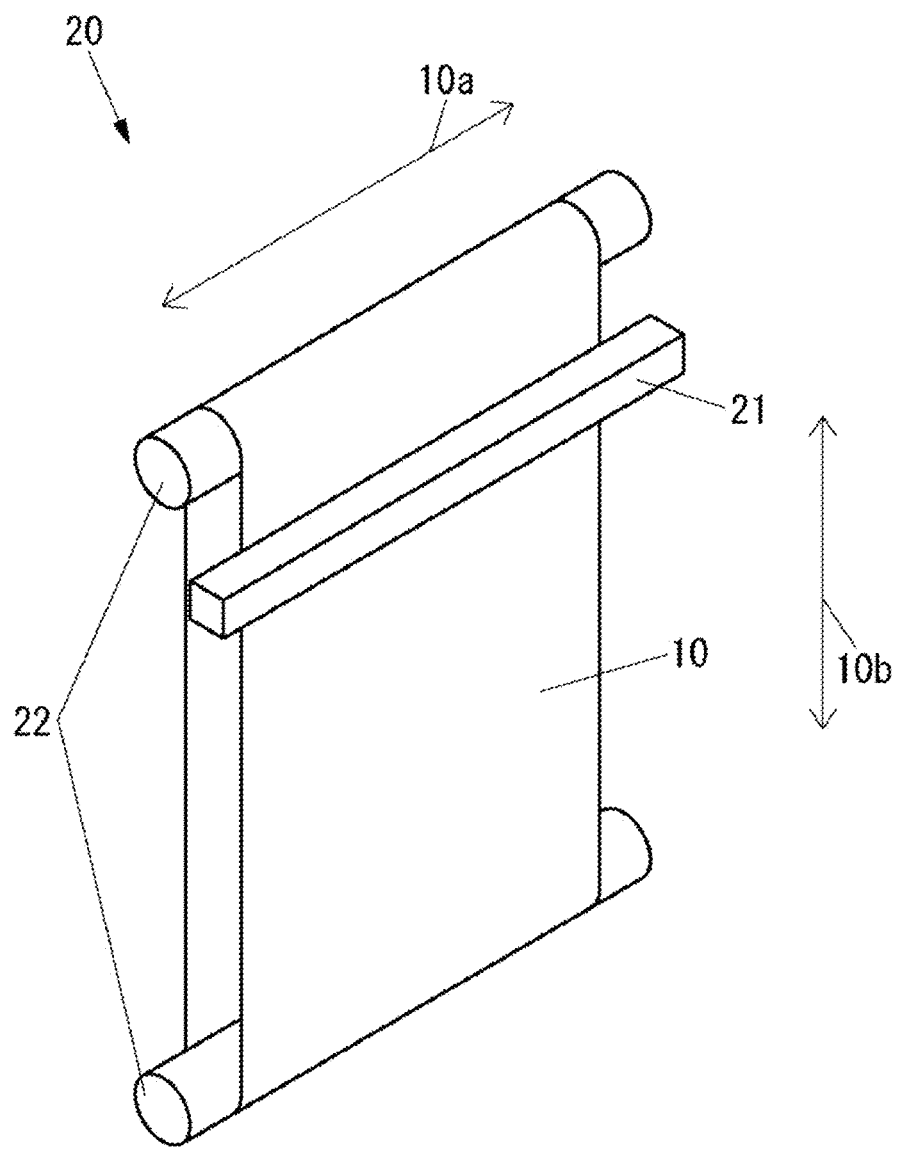
FIG. 2 is a diagram illustrating an example of an imaging system that captures an intermediate transfer belt during a capturing step illustrated in FIG. 1.

FIG. 2 is a diagram illustrating an example of an imaging system 20 that captures an intermediate transfer belt 10 during the capturing step at S101.

As illustrated in FIG. 2, the imaging system 20 includes an imaging device 21 that captures the intermediate transfer belt 10 and a belt moving device 22 that moves the intermediate transfer belt 10 relative to the imaging device 21. The imaging device 21 is preferably arranged parallel to the width direction of the intermediate transfer belt 10 as indicated by an arrow 10a. The imaging device 21 includes a light source (not illustrated) that extends in the extending direction of the imaging device 21 to irradiate the surface of the intermediate transfer belt 10 with light and an imaging unit (not illustrated) such as a line sensor that extends in the extending direction of the imaging device 21 to capture the surface of the intermediate transfer belt 10. The imaging device 21 is preferably located as close as possible to the surface of the intermediate transfer belt 10.

A non-belt portion, which is not a belt portion, also naturally appearing at an end portion of the intermediate transfer belt due to the angle of view of the imaging device, which is typically set to be larger than the width of the intermediate transfer belt, is excluded from the processing target by cutting off or masking as the non-belt portion is not the target region for examination of a belt defect.

A captured image of the intermediate transfer belt 10 during the capturing step at S101 is generated by synthesizing the images captured line by line by the imaging device 21. The length of the captured image of the intermediate transfer belt 10 during the capturing step at S101 in the direction corresponding to the circumferential direction of the intermediate transfer belt 10 is longer than the length of the intermediate transfer belt 10 by one rotation. That is, the captured image includes overlapped portions at both ends in the direction corresponding to the circumferential direction of the intermediate transfer belt 10.

Figure 3:
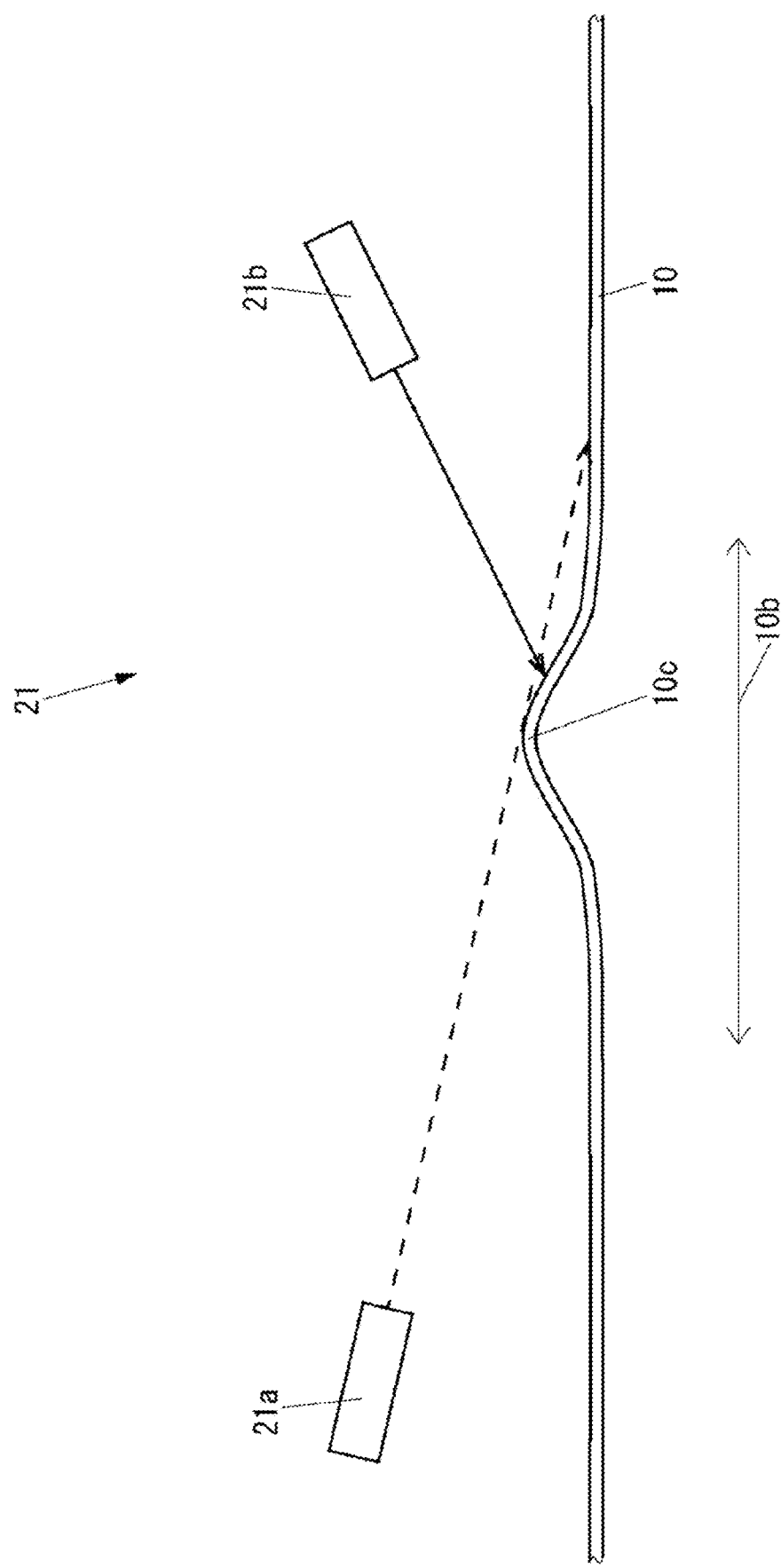
FIG. 3 is a diagram illustrating an example of an imaging device illustrated in FIG. 2 different from the example illustrated in FIG. 2.

FIG. 3 is a diagram illustrating an example of the imaging device 21 different from the example illustrated in FIG. 2.

The imaging device 21 illustrated in FIG. 3 is different from the imaging device 21 illustrated in FIG. 2 in that a light source 21a that extends in the extending direction of the imaging device 21 to irradiate the surface of the intermediate transfer belt 10 with light is separated from an imaging unit 21b such as a line sensor that extends in the extending direction of the imaging device 21 to capture the surface of the intermediate transfer belt 10 in the direction indicated by an arrow 10b perpendicular to the direction indicated by the arrow 10a (see FIG. 2). The light source 21a irradiates the surface of the intermediate transfer belt 10 with light at a very shallow angle toward the imaging unit 21b. Therefore, as illustrated in FIG. 3, when a belt defect 10c is present on the surface of the intermediate transfer belt 10, the light emitted by the light source 21a is blocked by the belt defect 10c, which results in a shadow. Then, the imaging unit 21b captures the surface of the intermediate transfer belt 10 at a very shallow angle toward the light source 21a. Thus, as illustrated in FIG. 3, when the belt defect 10c is present on the surface of the intermediate transfer belt 10, the imaging unit 21b captures the shadow of the belt defect 10c caused due to the irradiation of light by the light source 21a.

Figure 4:
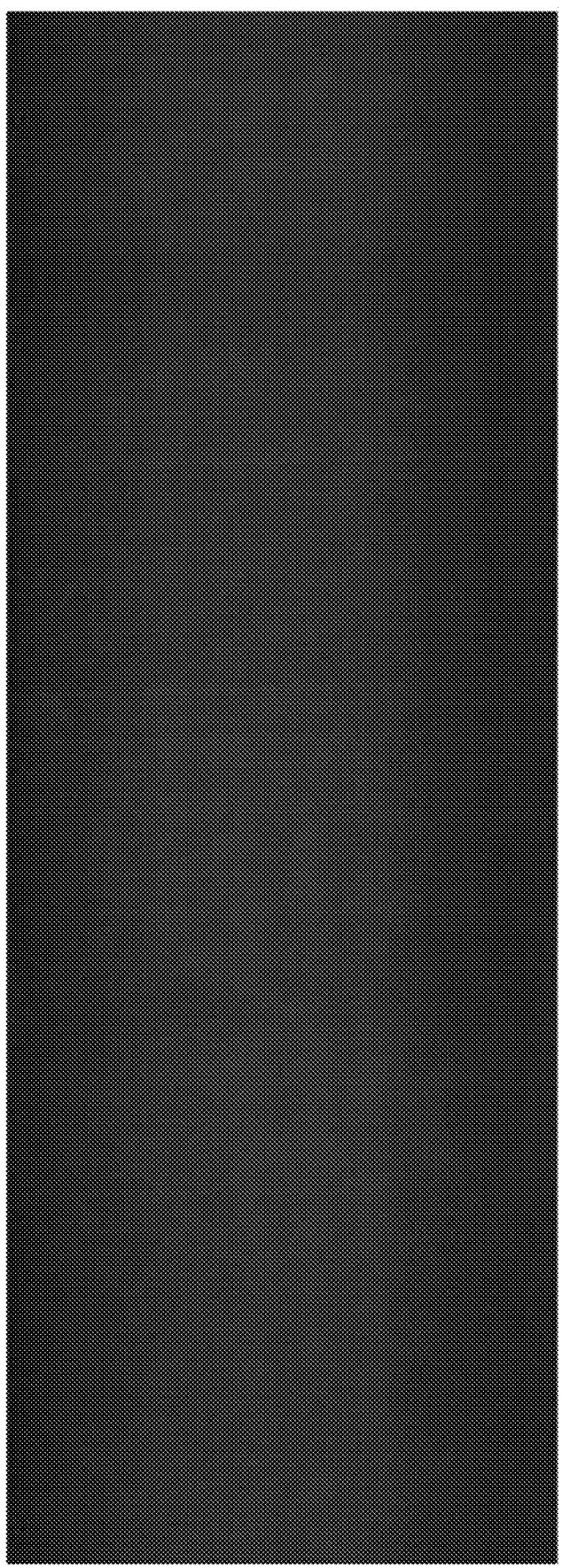
FIG. 4 is a diagram illustrating an example of a belt image captured during the capturing step illustrated in FIG. 1.
Figure 5:
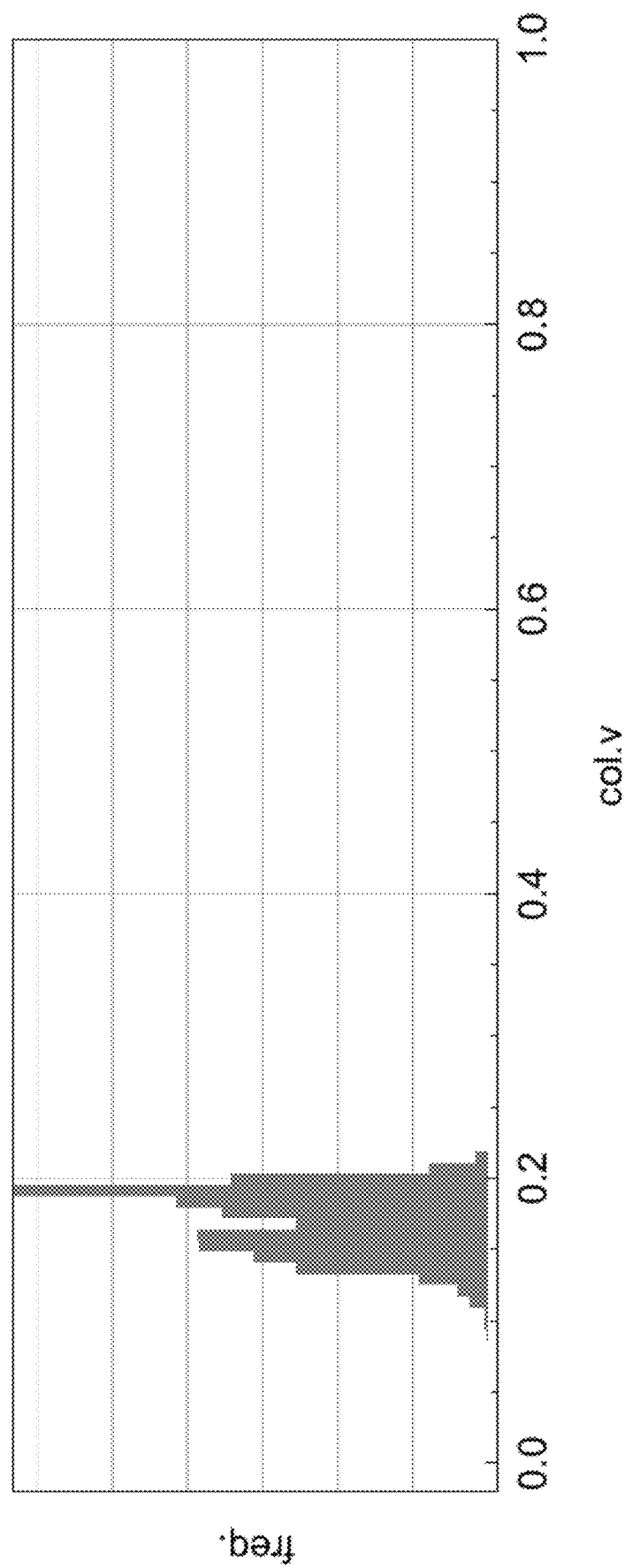
FIG. 5 is a graph illustrating a histogram distribution of color values of the belt image illustrated in FIG. 4.

FIG. 4 is a diagram illustrating an example of a belt image 41 captured during the capturing step at S101. FIG. 5 is a graph illustrating the histogram distribution of the color values of the belt image 41.

As illustrated in FIGS. 4 and 5, the unprocessed belt image 41, which is merely output from the imaging device, typically has a low color value and a narrow color value range, which cause unclear details of the surface of the intermediate transfer belt.

Figure 6:
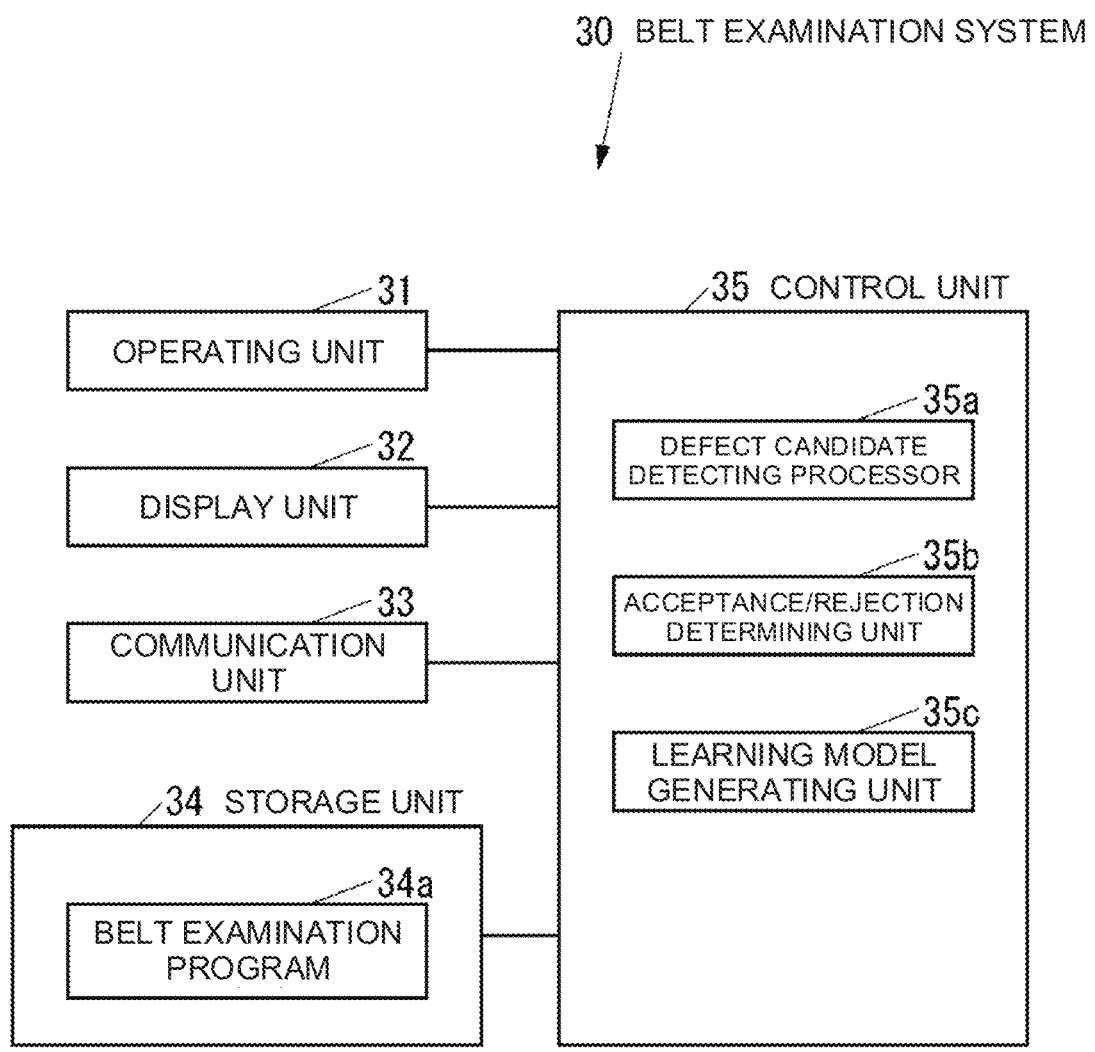
FIG. 6 is a block diagram of a belt examination system when the belt examination system is implemented by one computer.

A belt examination system 30 illustrated in FIG. 6 performs the image diagnosis step illustrated in FIG. 1.

FIG. 6 is a block diagram of the belt examination system 30 when the belt examination system 30 is implemented by one computer.

The belt examination system 30 illustrated in FIG. 6 includes an operating unit 31 that is an operating device such as a keyboard and a mouse with which various operations are input, a display unit 32 that is a display device such as a liquid crystal display (LCD) that displays various types of information, a communication unit 33 that is a communication device that communicates with an external device via a network such as a local area network (LAN) or the Internet or directly by wire or wirelessly without a network, a storage unit 34 that is a non-volatile storage device such as a semiconductor memory or a hard disk drive (HDD) that stores various types of information, and a control unit 35 that controls the overall belt examination system 30.

The storage unit 34 stores a belt examination program 34a to detect a belt defect. For example, the belt examination program 34a may be installed in the belt examination system 30 at the manufacturing stage of the belt examination system 30, may be additionally installed in the belt examination system 30 from an external storage medium such as a compact disk (CD), a digital versatile disk (DVD), or a Universal Serial Bus (USB) memory, or may be additionally installed in the belt examination system 30 from a network.

The control unit 35 includes, for example, a central processing unit (CPU), a read only memory (ROM) that stores programs and various types of data, and a random access memory (RAM) that is a memory used as a work area of the CPU of the control unit 35. The CPU of the control unit 35 executes a program stored in the storage unit 34 or the ROM of the control unit 35.

The control unit 35 executes the belt examination program 34a to implement a defect candidate detecting processor 35a that detects a candidate for a belt defect from a belt image, an acceptance/rejection determining unit 35b that uses a learning model to determine whether the quality of the intermediate transfer belt is accepted or rejected with regard to a candidate for a belt defect detected by the defect candidate detecting processor 35a, and a learning model generating unit 35c that generates a learning model by using a candidate for a belt defect detected by the defect candidate detecting processor 35a.

In FIG. 6, the belt examination system 30 is implemented by one computer. Alternatively, the belt examination system 30 may be implemented by a plurality of computers.

Figure 7:
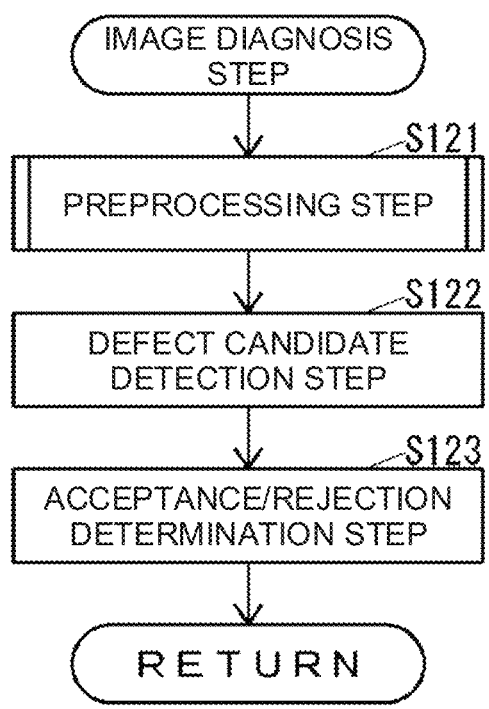
FIG. 7 is a flowchart of an image diagnosis step illustrated in FIG. 1.

FIG. 7 is a flowchart of the image diagnosis step illustrated in FIG. 1.

As illustrated in FIG. 7, the image diagnosis step at S102 (see FIG. 1) includes a preprocessing step (S121) to perform preprocessing on a belt image so as to detect a candidate for a belt defect, a defect candidate detection step (S122) to detect a candidate for a belt defect based on the belt image preprocessed during the preprocessing step at S121, and an acceptance/rejection determination step (S123) to determine acceptance or rejection with regard to a candidate for a belt defect extracted during the defect candidate detection step at S122.

Figure 8:
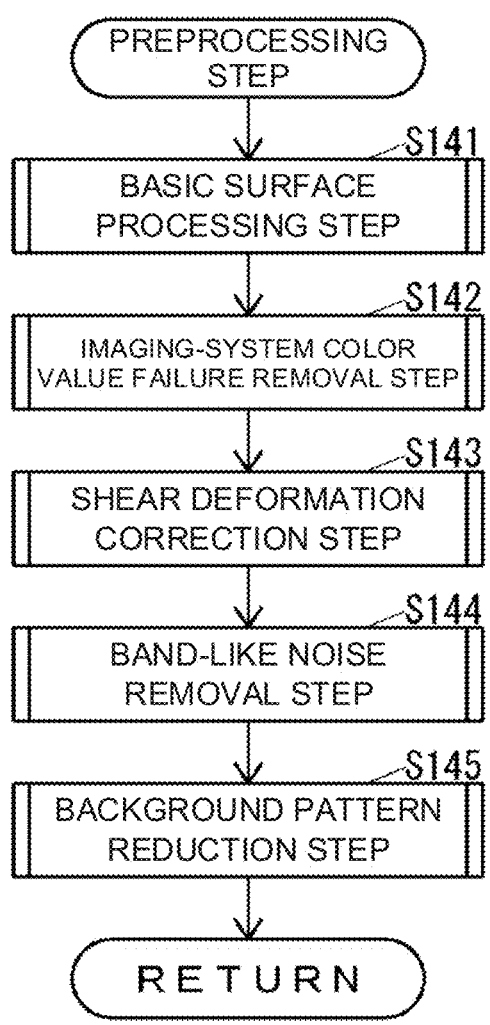
FIG. 8 is a flowchart of a preprocessing step illustrated in FIG. 7.

FIG. 8 is a flowchart of the preprocessing step illustrated in FIG. 7.

As illustrated in FIG. 8, the preprocessing step at S121 (see FIG. 7) includes a basic surface processing step (S141) to perform basis surface processing so as to extract a belt defect at a subsequent step from the belt image obtained during the capturing step at S101, an imaging-system color value failure removal step (S142) to remove, from the belt image, the component that is assumed to be included during the capturing of the capturing step at S101 and affects the color value of the belt image regardless of the surface condition of the intermediate transfer belt, a shear deformation correction step (S143) to conduct reverse correction on a sheared and deformed belt image, a band-like noise removal step (S144) to remove, from the belt image, a band-like or streaky noise extending in the width direction of the intermediate transfer belt, and a background pattern reduction step (S145) to reduce the effect produced on the belt image by a texture that is a pattern of a background portion around a belt defect on the surface of the intermediate transfer belt.

Figure 9:
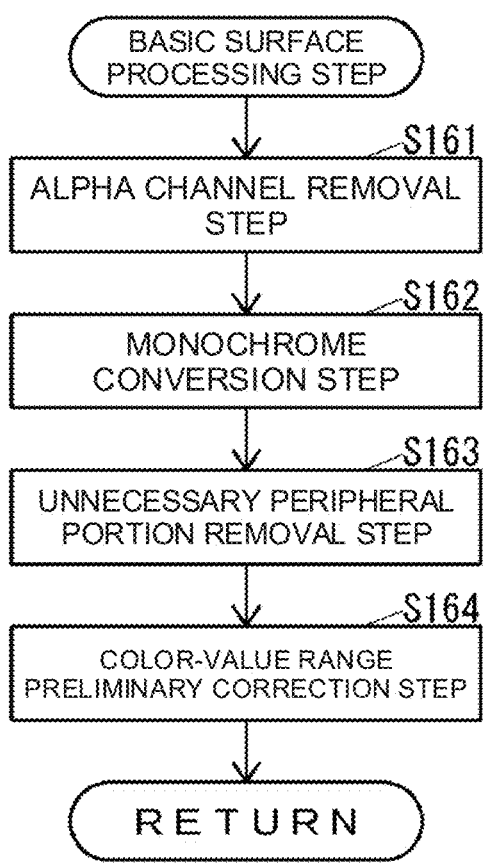
FIG. 9 is a flowchart of a basic surface processing step illustrated in FIG. 8.

FIG. 9 is a flowchart of the basic surface processing step illustrated in FIG. 8.

As illustrated in FIG. 9, the basic surface processing step at S141 (see FIG. 8) includes, for example, an alpha channel removal step (S161) to remove an alpha channel and the effect of an alpha channel from the belt image, a monochrome conversion step (S162) to convert a belt image, which is a full-color image, into a monochrome image, an unnecessary peripheral portion removal step (S163) to cut off a non-belt portion appearing in the upper, lower, right, or left end due to the capturing range of the imaging device or a portion included in the belt portion and affected by the surrounding non-belt portion and to further cut off or fill a portion so as to unify the image size after cutting off, and a color-value range preliminary correction step (S164) to preliminarily correct the range of color values so as to make it easy for a person to observe the surface state of the intermediate transfer belt or make it easy for the belt examination system 30 to detect microscopic changes.

If a non-belt portion has been accurately removed during the unnecessary peripheral portion removal step at S163, the color value of the non-belt portion does not affect the correction of the color value range during the color-value range preliminary correction step at S164. Therefore, in order to correct the color value range more appropriately during the color-value range preliminary correction step at S164, the unnecessary peripheral portion removal step at S163 is performed before the color-value range preliminary correction step at S164.

The unnecessary peripheral portion removal step at S163 is described.

During capturing of the intermediate transfer belt, a non-belt portion often appears at the right and left ends of the image because the angle of view of the imaging device is set to be wider than the width of the intermediate transfer belt. In the process to correct the color value of the belt image, when the correction is conducted without removing a non-belt portion, its effect is often significant depending on the area or the value of the non-belt portion. Therefore, the non-belt portion is carefully cut off or masked in advance so as to be excluded from the analysis processing target.

Slightly different image sizes of belt images cause difficulty in image processing in many ways and, in order to avoid it, the image end may be further cut off or padding processing may be performed to obtain the defined size. For example, the padding processing may be to apply the color value of a pixel at the outermost end of the belt image after cutting off the unnecessary portion or apply the average value of the color values of the belt portion.

An example of the size of the belt image is described; when the imaging device is a 2K camera and the image size is 2048 pixels×4792 pixels before the unnecessary peripheral portion removal step at S163 is executed, the image size is 1698 pixels×4792 pixels after the unnecessary peripheral portion removal step at S163 is executed.

The color-value range preliminary correction step at S164 is described.

As illustrated in FIGS. 4 and 5, the unprocessed belt image 41, which is output from the imaging device, typically has a low color value and a narrow color value range, which cause unclear details of the surface of the intermediate transfer belt, as described above. Therefore, as previous and preliminary processing to facilitate the subsequent processing, the color value range is corrected.

For example, it may be executed as follows. First, a color value of the belt image captured by the imaging device is extracted, the number of pixels is then counted for each color value to generate a histogram distribution, and further it is accumulated to calculate a cumulative distribution. Here, the frequency value or the cumulative value is divided by the total number of pixels to be normalized so that the color value at which the cumulative value is a specific dark-side threshold is defined as the start point of the color value distribution of the belt image captured by the imaging device and the color value at which the cumulative value is a specific bright-side threshold is defined as the end point of the color value distribution of the belt image captured by the imaging device. The dark-side threshold is set to, for example, 0.0025, and the bright-side threshold is set to, for example, 0.9975. Therefore, the color value at which the cumulative value of the color values of the belt image captured by the imaging device is the dark-side threshold, for example, the color value near 0.1 in FIG. 5 is defined as the color value at the start point of the color value distribution, and the color value at which the cumulative value of the color values of the belt image captured by the imaging device is the bright-side threshold, for example, the color value near 0.22 in FIG. 5 is defined as the color value at the end point of the color value distribution.

Alternatively, the range sufficiently covering the entire distribution is simply set from the histogram distribution of the color values of the belt image captured by the imaging device so that, for example, in FIG. 5, the bright-side color value, i.e., the color value at the start point may be set to 0.0 and the dark-side color value, i.e., the color value at the end point may be set to 0.3.

Then, the color value range after the color value correction is set. For example, conversion is executed by using the following equation.

$$\text{after}[i] = \{(\text{after}[max] - \text{after}[min])\} * \{(\text{before}[i] - \text{before}[min])/(\text{before}[max] - \text{before}[min])\} + \text{after}[min] + \text{offset1}$$

before[min]: the color value corresponding to the dark-side threshold of the unprocessed belt image output from the imaging device before[max]: the color value corresponding to the bright-side threshold of the unprocessed belt image output from the imaging device after[min]: the color value corresponding to the start point of the distribution of the belt image on the dark side after the color-value range preliminary correction step after[max]: the color value corresponding to the end point of the distribution of the belt image on the bright side after the color-value range preliminary correction step offset1: the offset color value For example, after[min], which is the start point of the color value range after the color value correction, may be set to 0.3 and after[max], which is the end point of the color value range after the color value correction, may be set to 0.9. Further, because of the darkness in whole, in order to improve the visibility, offset1 may be given as the offset color value so as to shift the entire color value distribution.

The value range of after[i] is basically assumed to be from 0.0 to 1.0, and a color value less than the dark-side threshold and a color value more than the bright-side threshold, which may be less than 0.0 or more than 1.0 after the color value conversion, are clipped to be 0.0 or 1.0, respectively. That is, the color value less than 0.0 is replaced with 0.0, and the color value more than 1.0 is replaced with 1.0.

As described above, the range of the color values corresponding to the start point and the end point of the distribution of color values of the input image is linearly converted to generate an output image in a specific color value range.

Furthermore, after[i] may be converted as in for example the equation below to improve the visibility.

$$f[i]=\alpha*C[\text{after}[i]]^\gamma+\text{offset2}$$

α: gain
γ: gamma correction index
C: contrast correction function
offset2: offset color value That is, a gain may be given, a contrast function may be applied to obtain a substantially S shape, a gamma index may be applied, or an offset may be given.

As is the case with the value range of after[i], the value range of f[i] is also basically assumed to be from 0.0 to 1.0. Therefore, a pixel having a color value less than 0.0 is clipped to have a color value of 0.0, and a pixel having a color value more than 1.0 is clipped to have a color value of 1.0.

Figure 10:
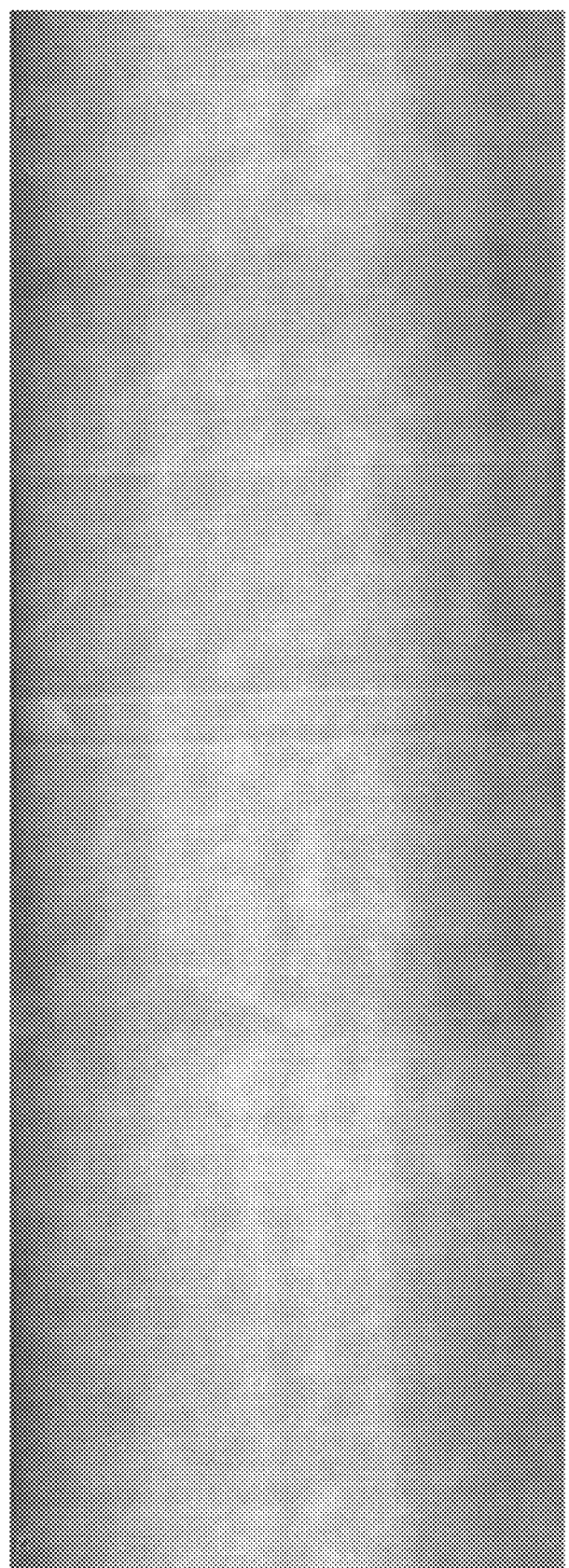
FIG. 10 is a diagram illustrating an example of a belt image obtained by processing the belt image illustrated in FIG. 4 during the basic surface processing step.
Figure 11:
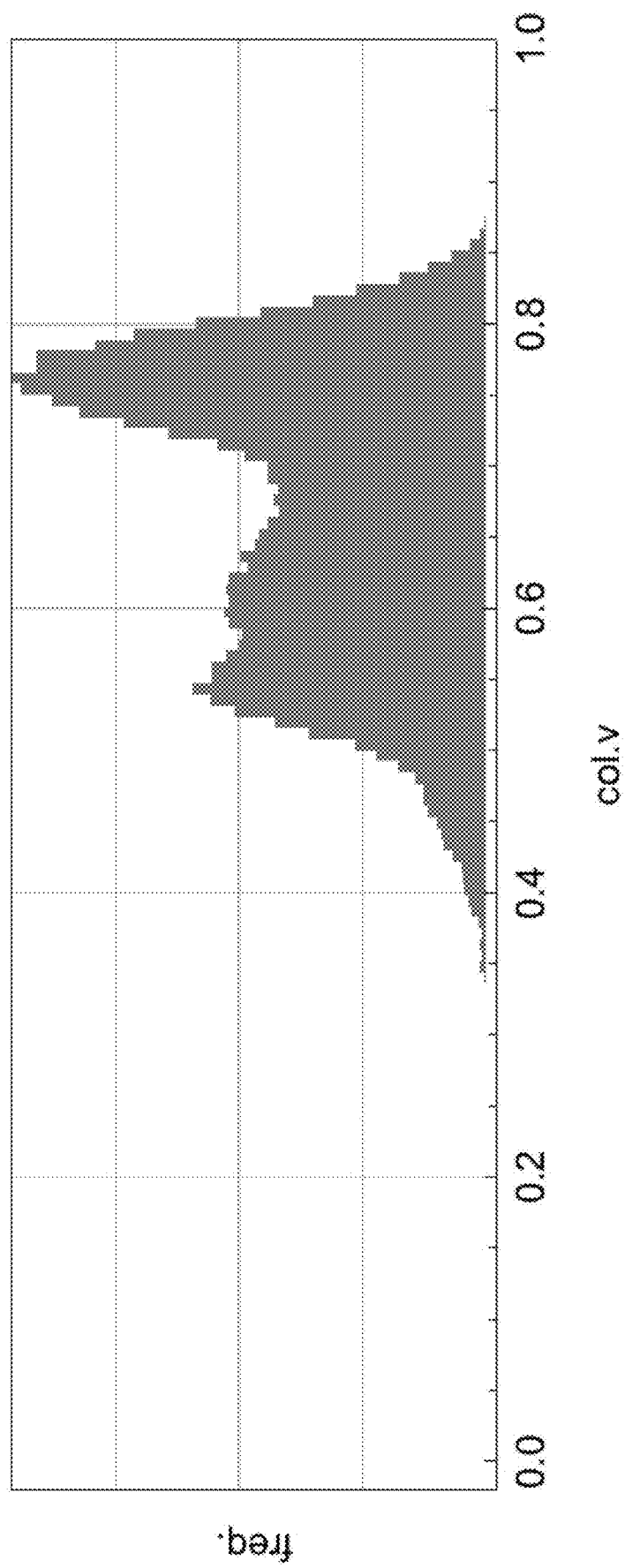
FIG. 11 is a graph illustrating a histogram distribution of color values of the belt image illustrated in FIG. 10.

FIG. 10 is a diagram illustrating an example of a belt image 42 obtained by processing the belt image 41 illustrated in FIG. 4 during the basic surface processing step at S141. FIG. 11 is a graph illustrating the histogram distribution of color values of the belt image 42.

The belt image 42 illustrated in FIG. 10 is obtained by conversion with after[min]: 0.3 and after[max]: 0.9 as illustrated in FIG. 11.

As illustrated in FIG. 10, the details of the surface state of the intermediate transfer belt in the belt image 42 are enhanced to some extent due to the basic surface processing step at S141 so that various things are observable. However, a belt defect, which is the detection target, is still hard to be observed due to interference of a noise (hereinafter referred to as "microscopic noise") having a microscopic size, such as dark current noise or photon noise, as compared with a belt defect, a stationary noise caused by an element for light falloff at edges in a lens of the imaging device, or the like, a non-stationary noise (hereinafter referred to as "color value unevenness") caused due to the inclusion of the shadow of an operator, an uneven illuminance of the illumination, etc.

Therefore, as illustrated in FIG. 8, after the basic surface processing step at S141, the imaging-system color value failure removal step at S142 is executed.

Figure 12:
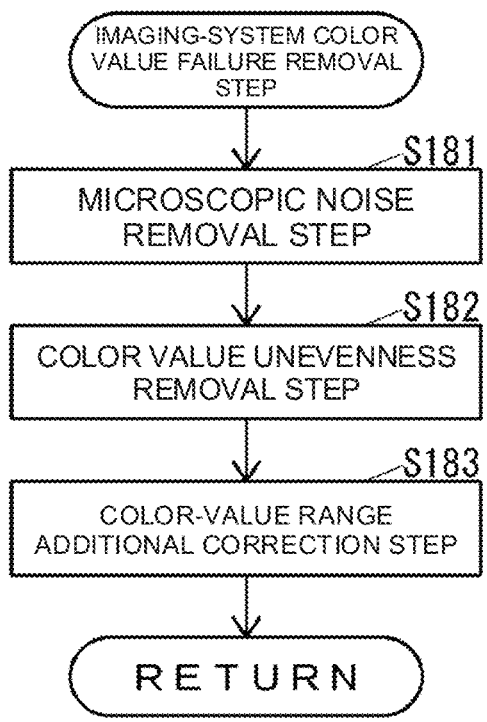
FIG. 12 is a flowchart of an imaging-system color value failure removal step illustrated in FIG. 8.

FIG. 12 is a flowchart of the imaging-system color value failure removal step illustrated in FIG. 8.

As illustrated in FIG. 12, the imaging-system color value failure removal step at S142 (see FIG. 8) includes a microscopic noise removal step (S181) to remove a microscopic noise component from the belt image, a color value unevenness removal step (S182) to remove color value unevenness from the belt image, and a color-value range additional correction step (S183) to further correct the color value range in order to make it easy for a person to observe the surface state of the intermediate transfer belt or make it easy for the belt examination system 30 to detect microscopic changes.

In the belt image in which the details of the surface of the intermediate transfer belt are enhanced, light falloff stationarily occurs in the periphery of the image due to vignetting of an optical system of the imaging device, or the like, and also irregular color value unevenness is observed, which is caused due to "undulation", "bias", or "crease" of the intermediate transfer belt, the inclusion of the shadow of the operator, etc., and which is unlikely to be associated with the surface state of the intermediate transfer belt.

Light falloff at edges in the optical system of the imaging device occurs over the entire width of the intermediate transfer belt, and color value unevenness, which is caused due to "undulation", "bias", or "crease" of the intermediate transfer belt, the inclusion of the shadow of the operator, etc. and which is unlikely to be associated with the surface state of the intermediate transfer belt, is large as compared with the standard size, i.e., the average size, of a belt defect, and there is several times to several tens of times difference in size.

The size of a microscopic noise, such as dark current noise, is a fraction of the standard size, i.e., the average size, of a belt defect, and there is also several times difference in size.

Figure 13:
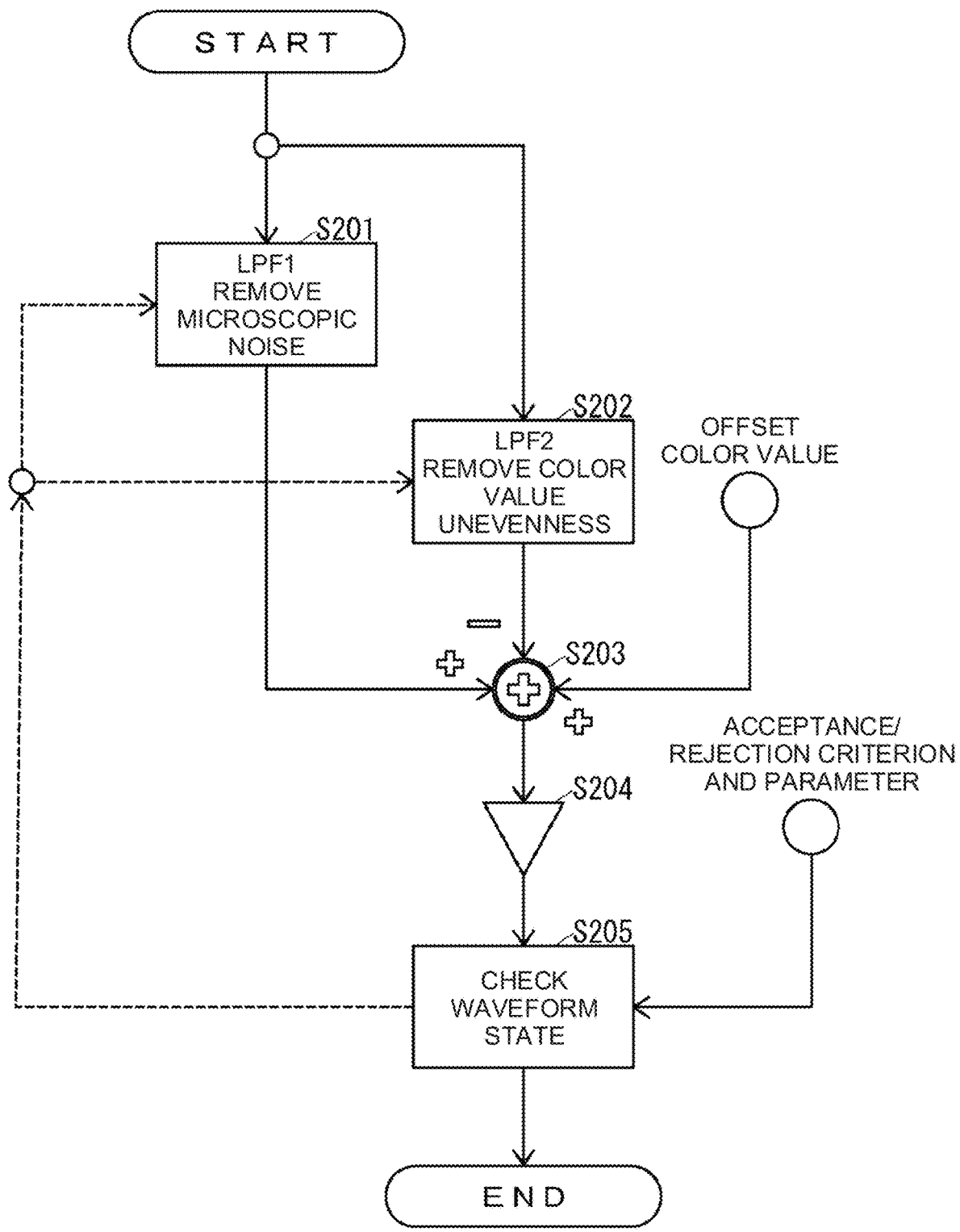
FIG. 13 is a diagram illustrating an example of the imaging-system color value failure removal step illustrated in FIG. 12.

FIG. 13 is a diagram illustrating an example of the imaging-system color value failure removal step illustrated in FIG. 12.

As illustrated in FIG. 13, first, an image from which a microscopic noise has been removed is obtained with regard to the belt image whose color value range has been preliminarily corrected during the color-value range preliminary correction step at S164 (see FIG. 9) (S201). For example, blurring and smoothing with a Gaussian filter, or the like, may be applied, and blurring with Gaussian kernel is applied for a size of about a fraction of the standard size of a belt defect, i.e., the average size of a belt defect. For example, when a belt defect has a radius of approximately 10 pixels, the convolution with Gaussian kernel having a radius of approximately 5 pixels and filter application may be executed to obtain an image. The process at S201 corresponds to the process at S181.

When the intermediate transfer belt may be scanned a plurality of times or may be exposed for a long period of time, a microscopic noise may be removed by multiplexing or long-time exposure and averaging.

Further, with regard to a belt image whose color value range has been preliminarily corrected during the color-value range preliminary correction step at S164, blurring with Gaussian kernel is applied for a size several times the standard size of a belt defect, i.e., the average size of a belt defect, so that an image is obtained in which light-dark variations several times smaller than color value unevenness, e.g., light-dark variations of about the size of a belt defect, have been averaged (S202). For example, when a belt defect has a radius of approximately 10 pixels, the convolution with Gaussian kernel having a radius of approximately 25 pixels and filter application may be executed to obtain an image.

Subsequently, the image obtained at S202 is subtracted from the image obtained at S201, and an offset color value is applied to adjust the color value of the image (S203). If necessary, in order to improve the visibility, the color value of the image is adjusted by further applying a gain, applying contrast, or applying an offset again (S204). Among the processes at S203 and S204, the process to subtract the image obtained at S202 from the image obtained at S201 corresponds to the process at S182. Further, among the process at S204, the process to apply an offset color value and the process at S204 correspond to the process at S183.

The image obtained by averaging the light-dark variations of about the size of a belt defect at S202 is subtracted from the image obtained by removing a microscopic noise at S201 and an offset color value is superimposed thereon (S203), whereby color value unevenness due to light falloff at edges in the imaging device, or the like, is removed, the surface state of the intermediate transfer belt itself becomes clearer, and a belt defect appears clearly.

After the process at S204, the state of a signal waveform output during the process at S204 is checked (S205). An acceptance/rejection criterion and a parameter for checking used during the process at S205 are previously set. When it is checked that the uniformity of the color value of the background image of the belt portion in the belt image is less than a specific level as a result of the process at S205, the size of the Gaussian kernel at S201 and the size of the Gaussian kernel at S202 are changed in accordance with the result of the process at S205, and then the imaging-system color value failure removal step illustrated in FIG. 13 is performed again. Conversely, when it is checked that the uniformity of the color value of the background image of the belt portion in the belt image is equal to or more than the specific level as a result of the process at S205, the imaging-system color value failure removal step illustrated in FIG. 13 ends.

Figure 14:
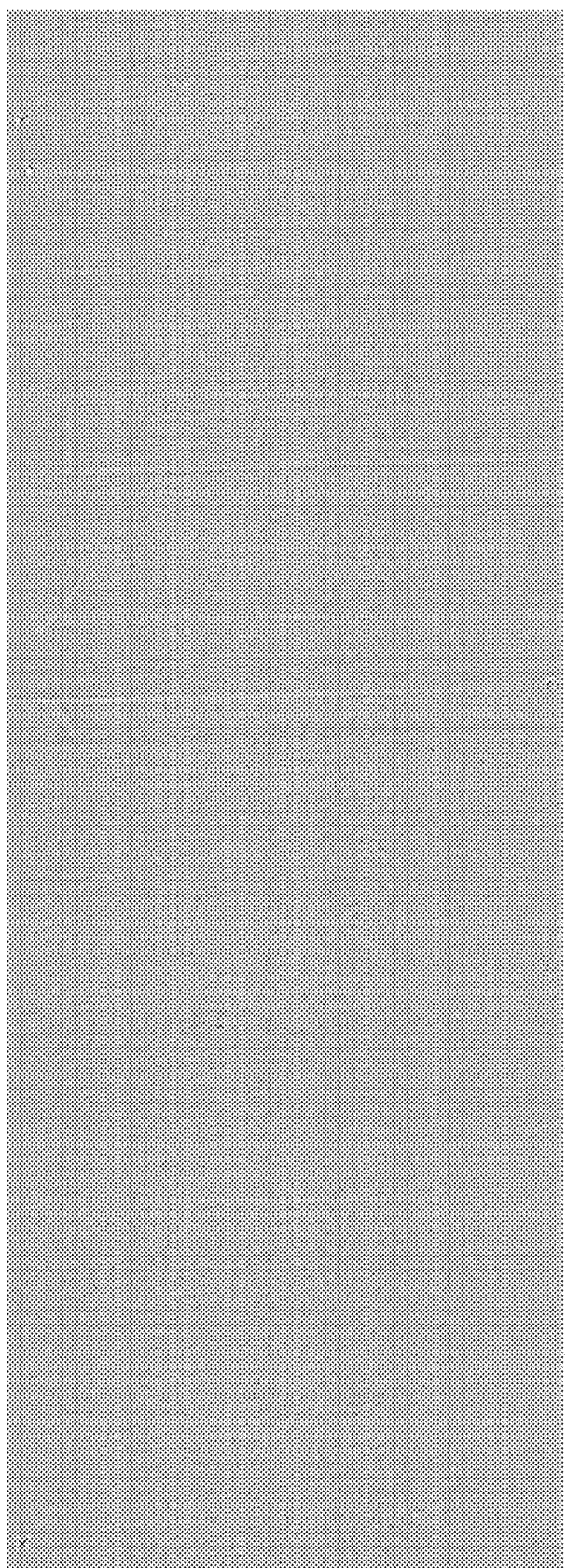
FIG. 14 is a diagram illustrating an example of a belt image obtained by processing the belt image illustrated in FIG. 10 during the imaging-system color value failure removal step.
Figure 15:
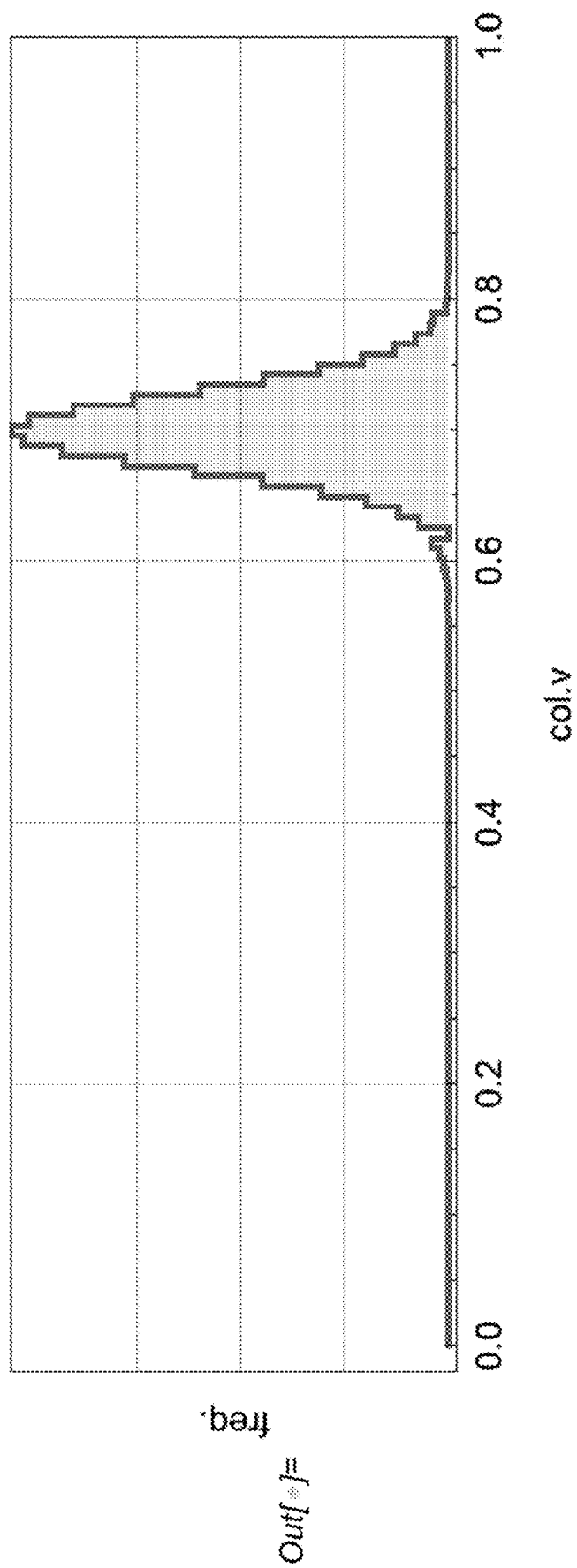
FIG. 15 is a graph illustrating a histogram distribution of color values of the belt image illustrated in FIG. 14.

FIG. 14 is a diagram illustrating an example of a belt image 43 obtained by processing the belt image 42 illustrated in FIG. 10 during the imaging-system color value failure removal step at S142. FIG. 15 is a graph illustrating the histogram distribution of the color value of the belt image 43.

As a result of color value adjustment in order to improve the visibility of the belt image 43 illustrated in FIG. 14, the histogram distribution illustrated in FIG. 15 has a peak near the color value of 0.7. As illustrated in FIGS. 14 and 15, it can be understood that the belt image 43 obtained during the process of the imaging-system color value failure removal step at S142 has no elements such as microscopic noises or color value unevenness. In the belt image 43 obtained during the process of the imaging-system color value failure removal step at S142, marks other than belt defects that are expected to be detected, e.g., manufacture-caused marks such as a mold line for molding the intermediate transfer belt, also appear, and a piece of coating material, or the like, which is sprayed onto the surface of the intermediate transfer belt during surface machining of the intermediate transfer belt and causes a black spot, which is hard to be found, are also easily found.

Figure 16A:
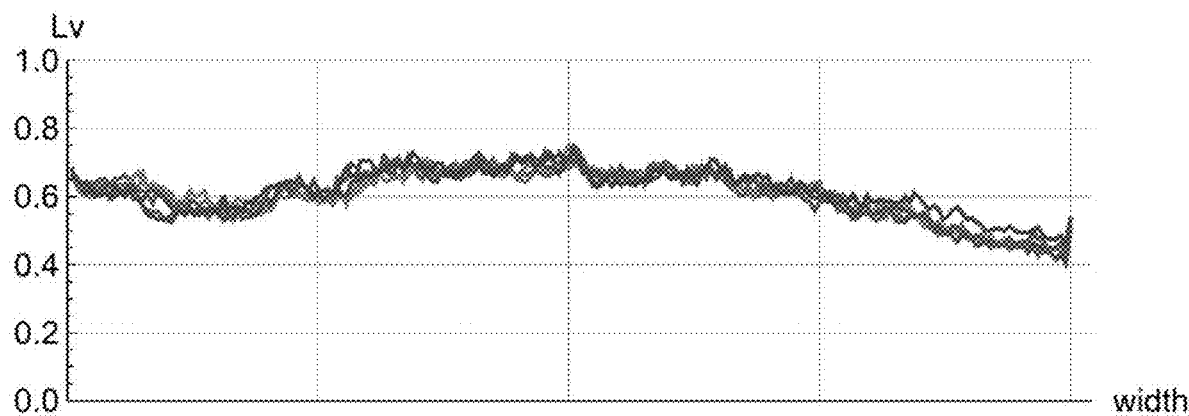
FIG. 16A is a graph obtained by plotting signal levels of several lines in the belt image illustrated in FIG. 10.
Figure 16B:
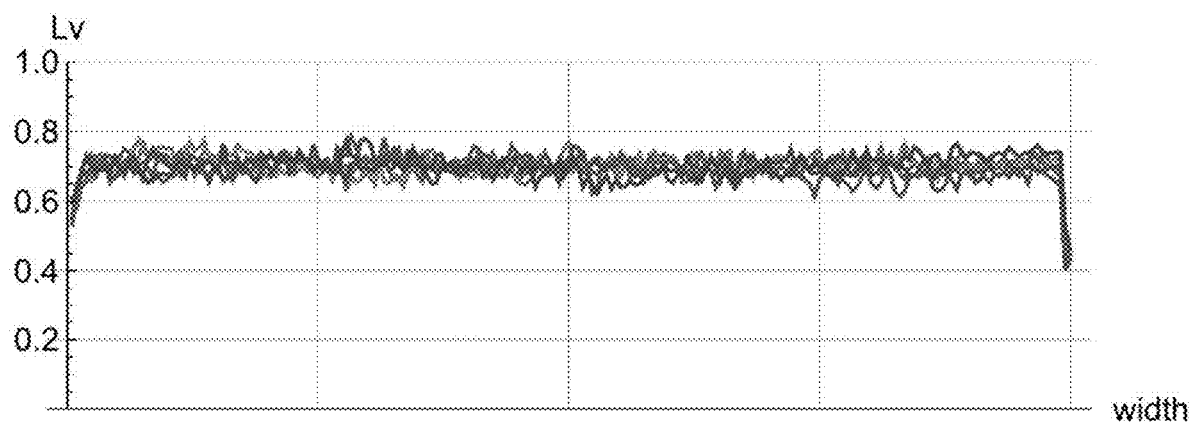
FIG. 16B is a graph obtained by plotting signal levels of several lines in the belt image illustrated in FIG. 14.

FIG. 16A is a graph obtained by plotting the signal levels of several lines in the belt image 42 illustrated in FIG. 10. FIG. 16B is a graph obtained by plotting the signal levels of several lines in the belt image 43 illustrated in FIG. 14.

In FIGS. 16A and 16B, the same type of line represents the signal level of the line at the same position. Here, the line is a row of pixels extending in the direction indicated by an arrow L (see FIG. 10 or 14) in the belt image, i.e., in substantially the same direction as the width direction of the intermediate transfer belt.

As illustrated in FIG. 16A, in the belt image 42 obtained during the process of the basic surface processing step at S141, the color value is high near the middle portion as compared with both end portions. However, in the belt image 43 obtained during the process of the imaging-system color value failure removal step at S142, as illustrated in FIG. 16B, it can be understood that color value unevenness has been removed and the color value is substantially constant over the entire width of the intermediate transfer belt.

Figure 17A:
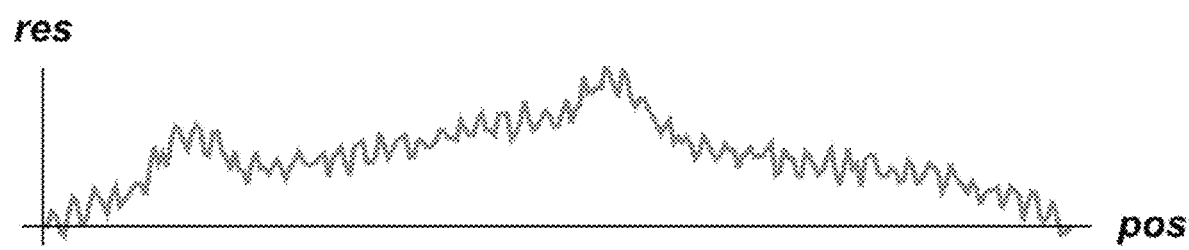
FIG. 17A is a schematic diagram illustrating an example of a color value signal of a belt image of an intermediate transfer belt having a belt defect.
Figure 17B:
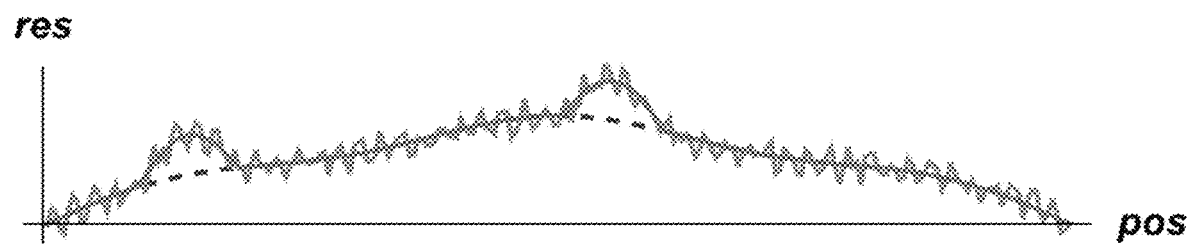
FIG. 17B is a schematic diagram illustrating the color value signal illustrated in FIG. 17A in a state where signal components are decomposed.
Figure 17C:
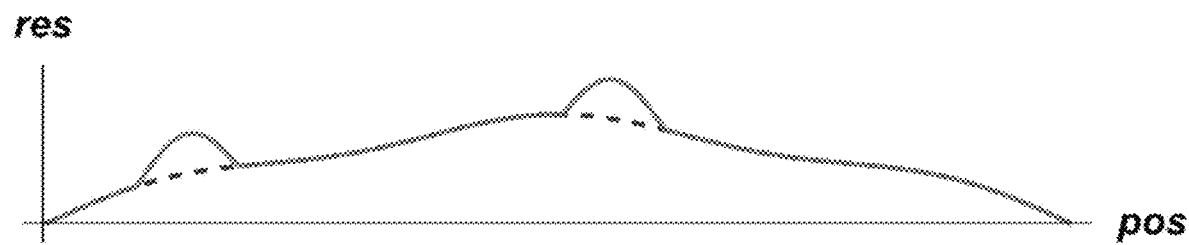
FIG. 17C is a schematic diagram illustrating a color value signal obtained by removing a signal component of a microscopic noise from the color value signal illustrated in FIG. 17A.
Figure 17D:
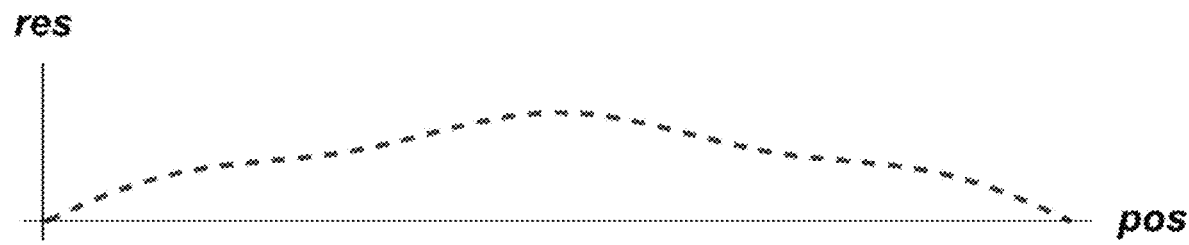
FIG. 17D is a schematic diagram illustrating a signal component of color value unevenness among the signal components illustrated in FIG. 17B.
Figure 18A:
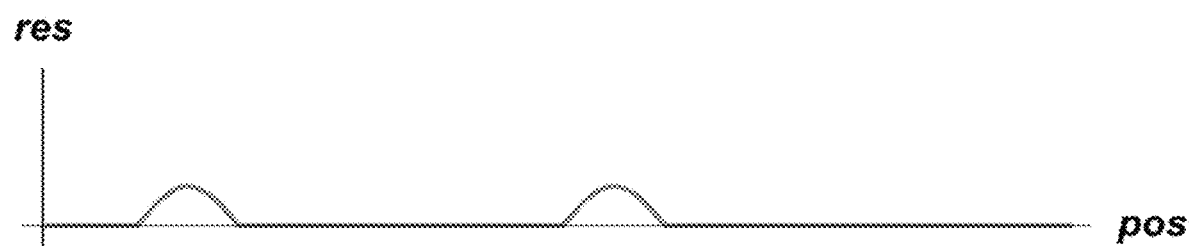
FIG. 18A is a schematic diagram illustrating a color value signal obtained by subtracting a color value signal illustrated in FIG. 17D from a color value signal illustrated in FIG. 17C.
Figure 18B:
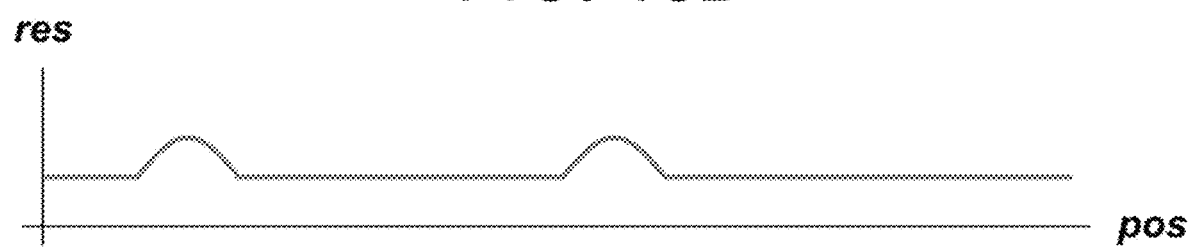
FIG. 18B is a schematic diagram illustrating a color value signal obtained by applying an offset color value to the color value signal illustrated in FIG. 18A.
Figure 18C:
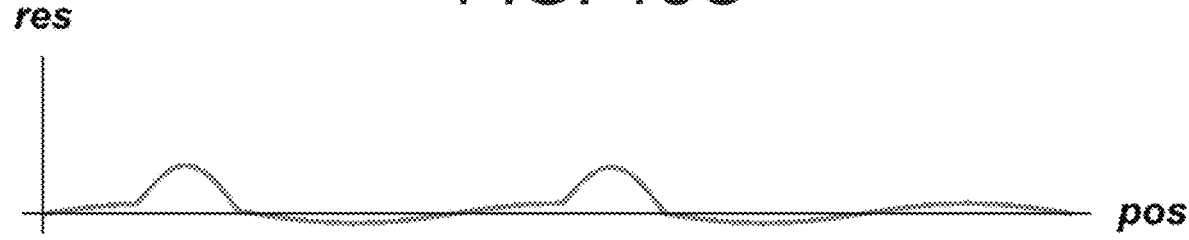
FIG. 18C is a schematic diagram illustrating the actual state of a color value signal obtained by subtracting a signal component of color value unevenness from a color value signal obtained by removing a signal component of a microscopic noise from a color value signal of a belt image of the intermediate transfer belt having a belt defect.
Figure 18D:
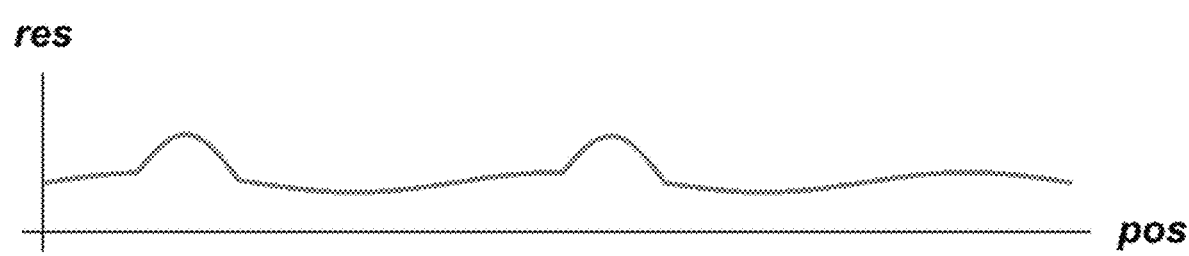
FIG. 18D is a schematic diagram illustrating a color value signal obtained by applying an offset color value to the color value signal illustrated in FIG. 18C.

FIG. 17A is a schematic diagram illustrating an example of the color value signal of a belt image of an intermediate transfer belt having a belt defect. FIG. 17B is a schematic diagram illustrating the color value signal illustrated in FIG. 17A in a state where signal components are decomposed. FIG. 17C is a schematic diagram illustrating a color value signal obtained by removing a signal component of a microscopic noise from the color value signal illustrated in FIG. 17A. FIG. 17D is a schematic diagram illustrating a signal component of color value unevenness among the signal components illustrated in FIG. 17B. FIG. 18A is a schematic diagram illustrating a color value signal obtained by subtracting the color value signal illustrated in FIG. 17D from the color value signal illustrated in FIG. 17C. FIG. 18B is a schematic diagram illustrating a color value signal obtained by applying an offset color value to the color value signal illustrated in FIG. 18A. FIG. 18C is a schematic diagram illustrating the actual state of the color value signal obtained by subtracting the signal component of color value unevenness from the color value signal obtained by removing the signal component of a microscopic noise from the color value signal of the belt image of the intermediate transfer belt having a belt defect. FIG. 18D is a schematic diagram illustrating the color value signal obtained by applying an offset color value to the color value signal illustrated in FIG. 18C.

The color value signal illustrated in FIG. 17A includes a mix of the signal component of a microscopic noise and the signal component of color value unevenness. The color value signal illustrated in FIG. 17A may be decomposed to signal components as illustrated in FIG. 17B.

When the signal component of a microscopic noise is removed from the color value signal illustrated in FIG. 17A during the process at S201, the color value signal illustrated in FIG. 17C is obtained.

During the process at S202, the color value variations of a microscopic noise and the color value variations of a belt defect size are averaged with regard to the color value signal illustrated in FIG. 17A, and the color value variations of a size larger than a belt defect is extracted so that the color value signal illustrated in 17D is obtained. That is, among the signal components illustrated in FIG. 17B, the low frequency component of a color value change, i.e., the signal component of color value unevenness is obtained as illustrated in FIG. 17D.

During the process at S203, when the color value signal illustrated in FIG. 17D is subtracted from the color value signal illustrated in FIG. 17C, the color value signal illustrated in FIG. 18A is obtained, and when an offset color value for adjusting the color value of the image is applied to the color value signal illustrated in FIG. 18A, the color value signal illustrated in FIG. 18B is obtained. The belt image represented by the color value signal illustrated in FIG. 18A is almost completely dark, and it is difficult to find the area of a belt defect; therefore, as illustrated in FIG. 18B, an offset color value is applied to increase the color value of the entire belt image so that it may be easier to find a belt defect in the belt image.

The color value signal illustrated in FIG. 18A is an ideal signal. Actually, as illustrated in FIG. 18C, localized color value unevenness slightly remains without being corrected. Therefore, when an offset color value for adjusting the color value of the belt image is applied to the color value signal illustrated in FIG. 18C, the color value signal illustrated in FIG. 18D is obtained.

Figure 19:
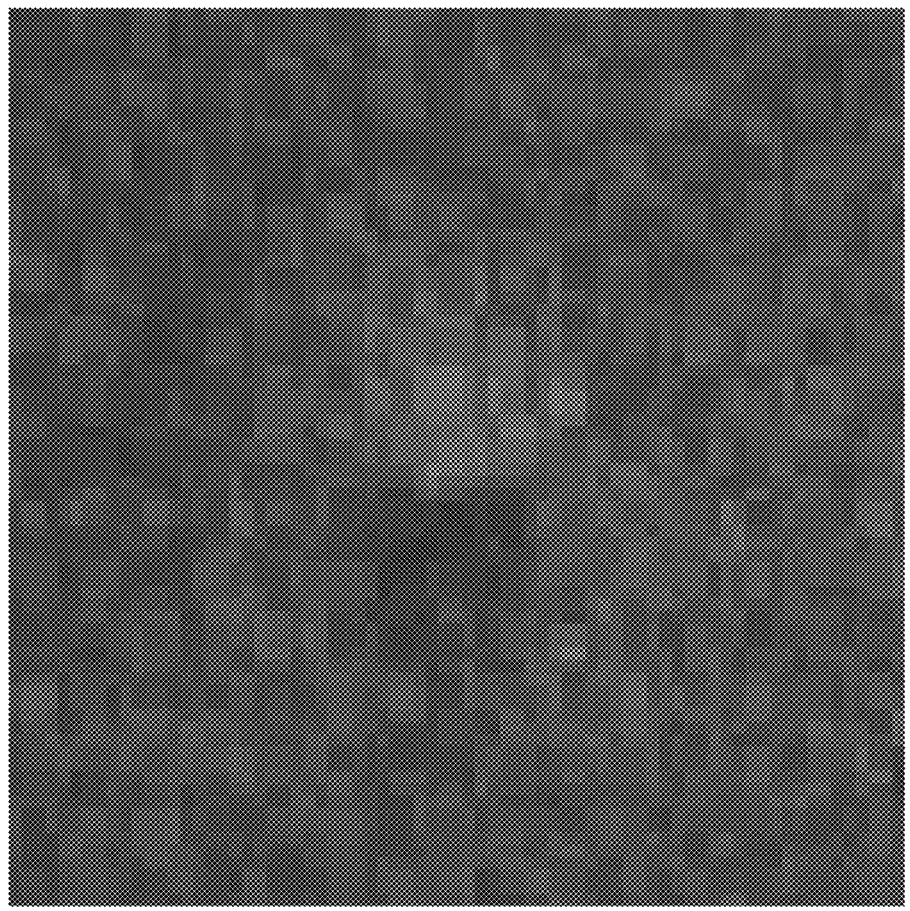
FIG. 19 is a diagram illustrating an example of an image of a belt defect portion in the belt image obtained during a process of the basic surface processing step illustrated in FIG. 8.

FIG. 19 is a diagram illustrating an example of the image of a belt defect portion in the belt image 42 obtained during the process of the basic surface processing step at S141.

As illustrated in FIG. 19, the image of the belt defect portion in the belt image 42 obtained during the process of the basic surface processing step at S141 is rough due to the effect of microscopic noises.

Figure 20:
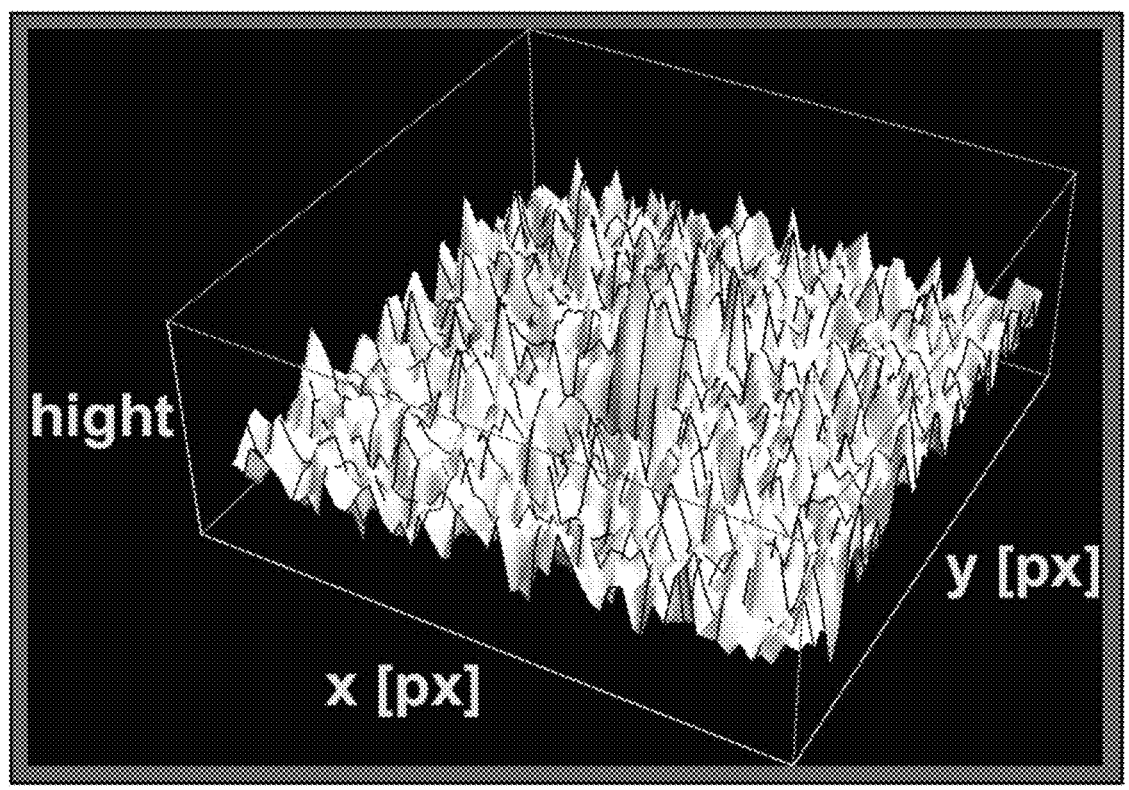
FIG. 20 illustrates a diagram obtained by plotting color values of the image illustrated in FIG. 19 as a three-dimensional graph.

FIG. 20 illustrates a diagram obtained by plotting the color values of the image illustrated in FIG. 19 as a three-dimensional graph.

As illustrated in FIG. 20, the left microscopic noises cause the state like a needle-shaped mountain. The levels of the microscopic noises are high as compared with the amount of color value change due to the belt defect itself, and the coordinate positions and heights of the microscopic noises are random; therefore, both belt defect detection using template matching and belt defect detection using machine learning are inconvenient while the microscopic noises are left. Thus, the microscopic noises are removed by the above-described method, etc.

Figure 21:
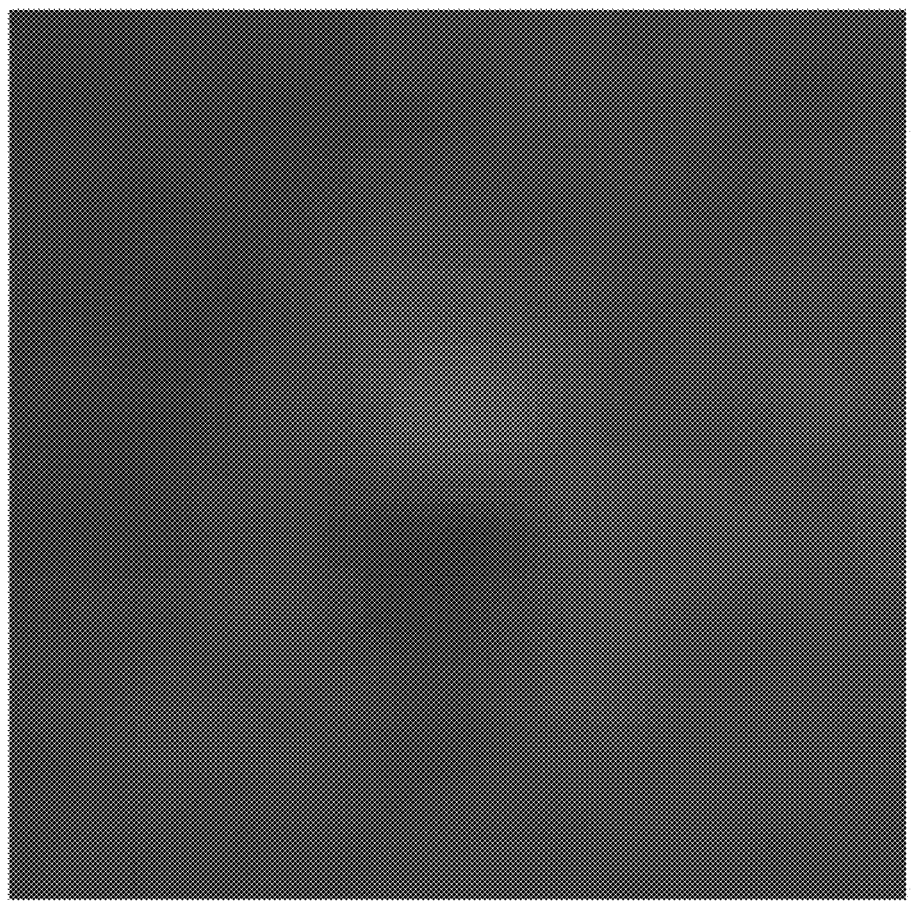
FIG. 21 is a diagram illustrating an example of an image of a belt defect portion after signal components of microscopic noises are removed from the image illustrated in FIG. 19.

FIG. 21 is a diagram illustrating an example of the image of the belt defect portion after the signal components of the microscopic noises are removed from the image illustrated in FIG. 19.

As illustrated in FIG. 21, after the signal components of the microscopic noises are removed from the image illustrated in FIG. 19, the image of the belt defect portion is smooth with the microscopic noises removed therefrom.

Figure 22:
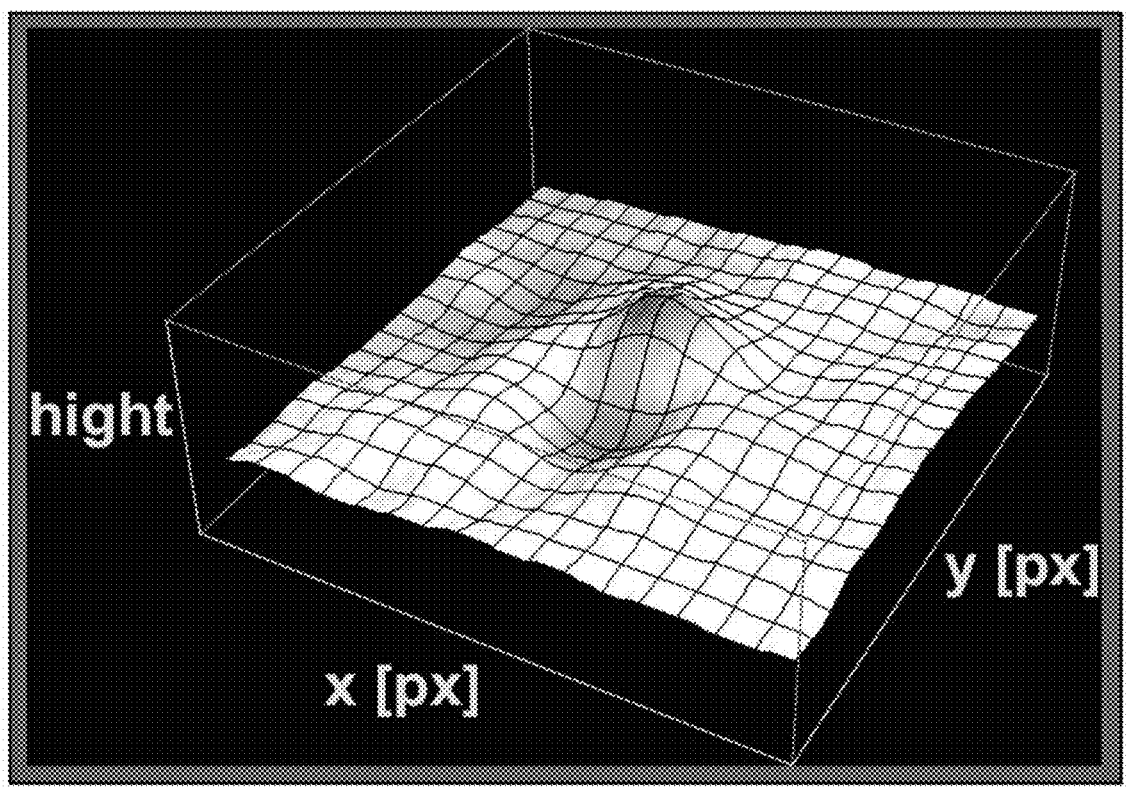
FIG. 22 illustrates a diagram obtained by plotting color values of the image illustrated in FIG. 21 as a three-dimensional graph.

FIG. 22 illustrates a diagram obtained by plotting the color values of the image illustrated in FIG. 21 as a three-dimensional graph.

As illustrated in FIG. 22, due to the removal of the microscopic noises, color value changes corresponding to the shape of the belt defect itself appear. However, as illustrated in FIG. 22, the color value variations of the belt defect are still on the color value variations of a size larger than the belt defect. Therefore, when the belt defect is extracted from the color value variations illustrated in FIG. 22, there is a possibility that the belt defect is misidentified. Thus, as described above, during the processes at S202 and S203, light-dark variations of a size larger than the belt defect are also removed.

Figure 23:
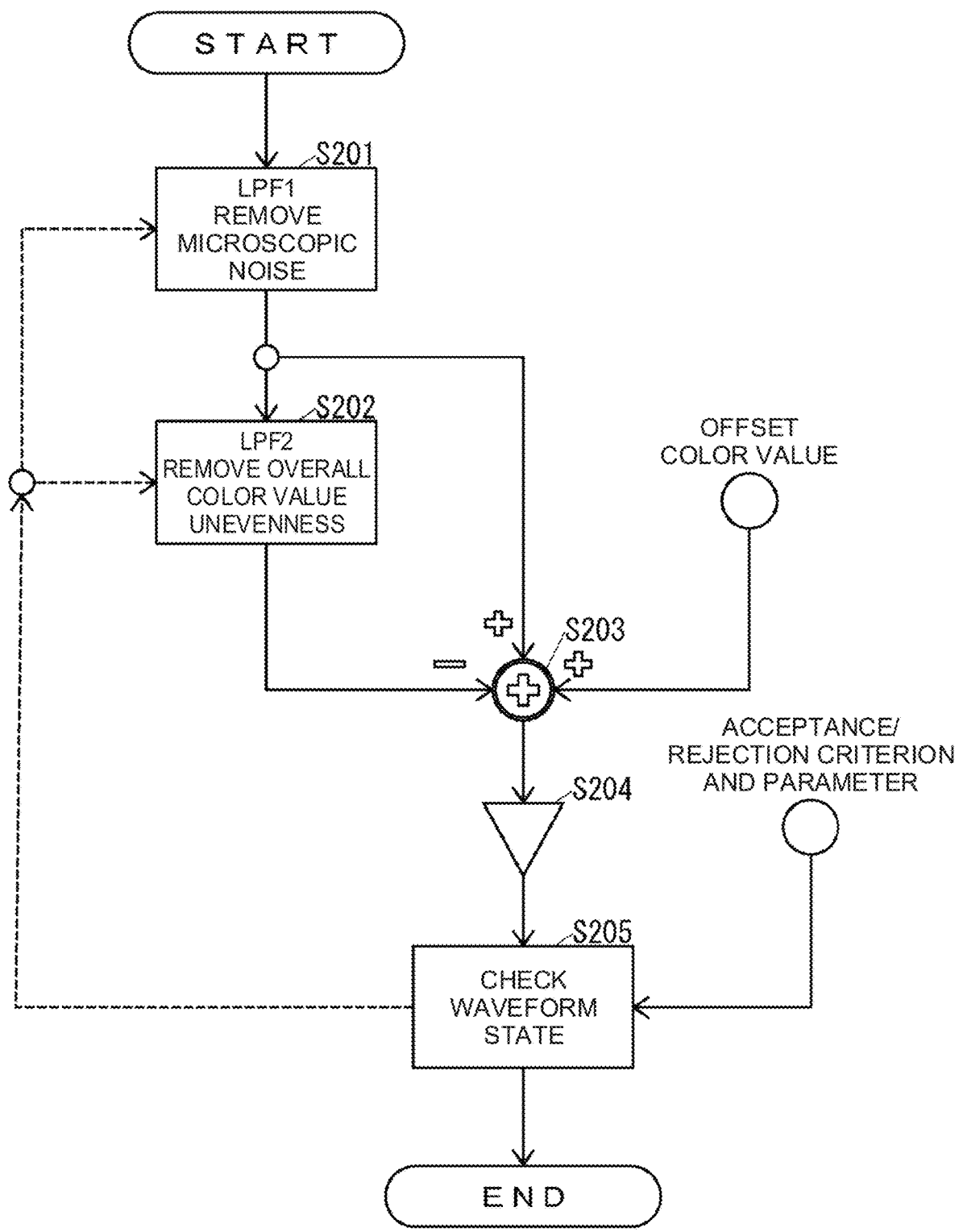
FIG. 23 is a diagram illustrating an example of the imaging-system color value failure removal step illustrated in FIG. 12 and illustrating an example different from the example illustrated in FIG. 13.

In the imaging-system color value failure removal step illustrated in FIG. 13, the processing target at S202 is the belt image whose color value range is preliminarily corrected during the color-value range preliminary correction step at S164. However, instead of the imaging-system color value failure removal step illustrated in FIG. 13, an imaging-system color value failure removal step illustrated in FIG. 23 may be adopted. In the imaging-system color value failure removal step illustrated in FIG. 23, the processing target at S202 is the image obtained at S201.

As illustrated in FIG. 14, due to the imaging-system color value failure removal step at S142, for example, molding marks at the time of extrusion molding during the production step of the intermediate transfer belt, scratch marks caused by the intermediate transfer belt and the jig during surface coating treatment, or the like, of the intermediate transfer belt, or processing marks of the intermediate transfer belt are observable in the belt image 43. The molding marks, scratch marks, processing marks, and the like, may be observed as band-like or streaky noises extending in the width direction of the intermediate transfer belt. Although band-like or streaky noises extending in the width direction of the intermediate transfer belt cause no failures with regard to the quality of the intermediate transfer belt in many cases, the noises are improperly detected as belt defects, which may reduce the accuracy of detecting belt defects and, as a result, cause a reduction in the accuracy of the acceptance/rejection determination of the intermediate transfer belt.

Therefore, as illustrated in FIG. 8, after the imaging-system color value failure removal step at S142, a shear deformation correction step at S143 and a band-like noise removal step at S144 are performed so as to remove a band-like or streaky noise extending in the width direction of the intermediate transfer belt.

With regard to the installation of the imaging device during the capturing step at S101, in a state where the imaging device is installed parallel to the width direction of the intermediate transfer belt, that is, in a state with a straight view from the front, the belt image includes the belt portion in a rectangular state and, as a result, a molding mark, scratch mark, processing mark, etc. extending in the width direction of the intermediate transfer belt is observed to be parallel to the line extending in the direction indicated by the arrow L (see FIG. 14) in the belt image. However, with regard to the installation of the imaging device during the capturing step at S101, when the imaging device is not installed parallel to the width direction of the intermediate transfer belt, the belt image includes the belt portion in a sheared and deformed state, that is, in the state of a parallelogram instead of a rectangle and, as a result, a molding mark, scratch mark, processing mark, etc. extending in the width direction of the intermediate transfer belt is observed to be inclined in the belt image. Therefore, the belt image is corrected to be the image in a state with a straight view from the front as it is supposed to be during the shear deformation correction step at S143.

Figure 24:
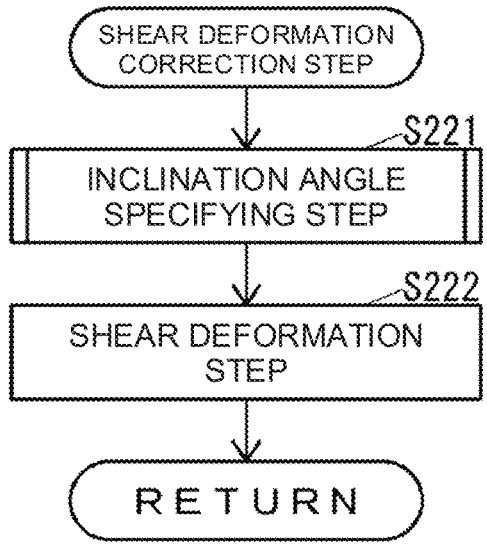
FIG. 24 is a flowchart of a shear deformation correction step illustrated in FIG. 8.

FIG. 24 is a flowchart of the shear deformation correction step illustrated in FIG. 8.

As illustrated in FIG. 24, the shear deformation correction step at S143 (see FIG. 8) includes an inclination angle specifying step (S221) to specify the inclination angle of the belt portion in the belt image and a shear deformation step (S222) to shear and deform the sheared and deformed belt image in the opposite direction in accordance with the inclination angle specified during the inclination angle specifying step at S221 to restore the belt image to the similar state as in a case where the imaging device is accurately installed to have a straight view from the front as it is supposed to be.

Figure 25:
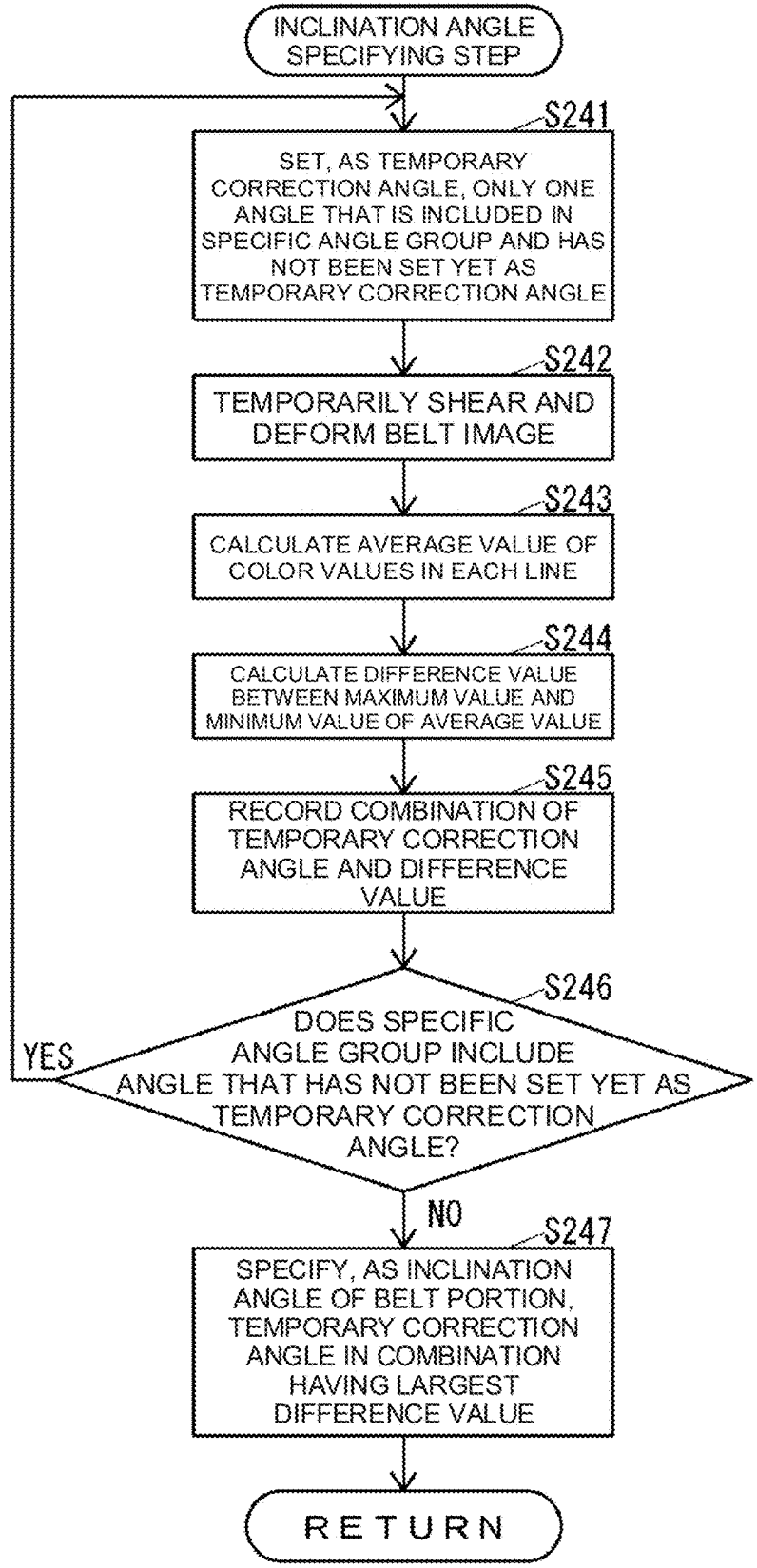
FIG. 25 is a flowchart of an inclination angle specifying step illustrated in FIG. 24.

FIG. 25 is a flowchart of the inclination angle specifying step illustrated in FIG. 24.

As illustrated in FIG. 25, the defect candidate detecting processor 35*a* sets, as a temporary correction angle, one angle that is included in a specific angle group and has not been set yet as a temporary correction angle during the inclination angle specifying step (S241). Here, the specific angle group is a group of angles at an interval of a specific pitch among the angles in a specific angle range including the angles at which it is assumed that shear deformation occurs, e.g., the angle range from −3° to +3°.

After the process at S241, the defect candidate detecting processor 35*a* temporarily shears and deforms the belt image at the temporary correction angle set at S241 (S242). The defect candidate detecting processor 35*a* may use, for example, an affine transformation as a shear deformation method for the belt image. A portion that is no longer a belt portion in the belt image as a result of shear deformation may be filled with, for example, the average value of the color values of the belt portion in the belt image before shear deformation.

After the process at S242, the defect candidate detecting processor 35*a* calculates the average value of the color values of the pixels in each line of the belt image sheared and deformed at S242 (S243). With regard to each line of the belt image sheared and deformed at S242, the defect candidate detecting processor 35a calculates the sum of the color values of all the pixels belonging to the corresponding line. The average value of the color values in each line may be calculated by dividing the sum by the number of all the pixels belonging to the corresponding line, or the average value of the color values in each line may be calculated by a technique other than simple averaging, e.g., by calculating the geometric mean with regard to the color values of all the pixels belonging thereto.

After the process at S243, the defect candidate detecting processor 35a calculates the difference value between the maximum value and the minimum value of the average value calculated at S243 (S244).

Subsequently, the defect candidate detecting processor 35a records the combination of the temporary correction angle set at S241 and the difference value calculated at S244 (S245).

Subsequently, the defect candidate detecting processor 35a determines whether the specific angle group includes an angle that has not been set yet as a temporary correction angle during this inclination angle specifying step (S246).

When it is determined at S246 that the specific angle group includes an angle that has not been set yet as a temporary correction angle during this inclination angle specifying step, the defect candidate detecting processor 35a performs the process at S241.

When it is determined at S246 that the specific angle group includes no angle that has not been set yet as a temporary correction angle during this inclination angle specifying step, the defect candidate detecting processor 35a specifies, as the inclination angle of the belt portion in the belt image, the temporary correction angle in the combination having the largest difference value among all the combinations recorded at S245 (S247). When a band-like or streaky noise extending in the width direction of the intermediate transfer belt is parallel to a line of the belt image, the maximum value of the average value of the color values of the pixels in each line of the belt image is highly likely to be the maximum and the minimum value of the average value of the color values of the pixels in each line of the belt image is highly likely to be the minimum. That is, when a band-like or streaky noise extending in the width direction of the intermediate transfer belt is parallel to a line of the belt image, the difference value between the maximum value and the minimum value of the average value of the color values of the pixels in each line of the belt image is highly likely to be the maximum. Therefore, at S247, the temporary correction angle in the combination having the largest difference value is specified as the inclination angle of the belt portion in the belt image.

The defect candidate detecting processor 35a ends the inclination angle specifying step illustrated in FIG. 25 after the process at S247.

Figure 26A:
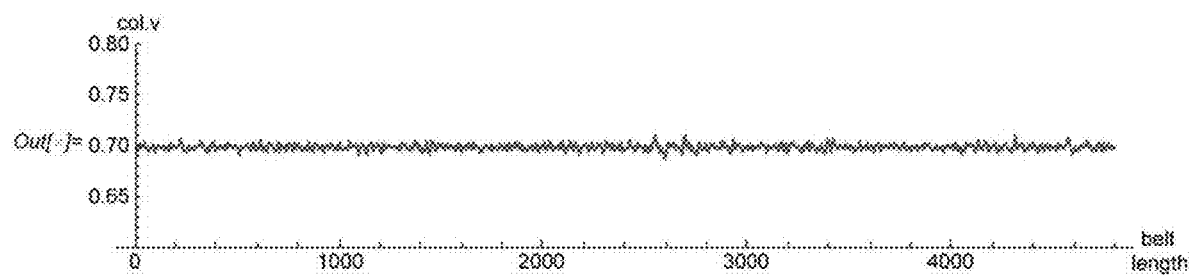
FIG. 26A is a graph illustrating an example of the average value of color values in each line of the belt image when a temporary correction angle is 0.00° during the inclination angle specifying step illustrated in FIG. 25.
Figure 26B:
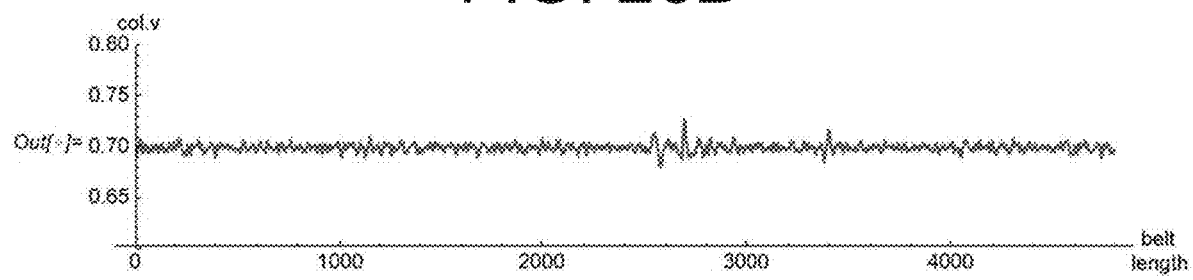
FIG. 26B is a graph illustrating an example of the average value of color values in each line of the belt image when the temporary correction angle is −0.85° during the inclination angle specifying step illustrated in FIG. 25.
Figure 26C:
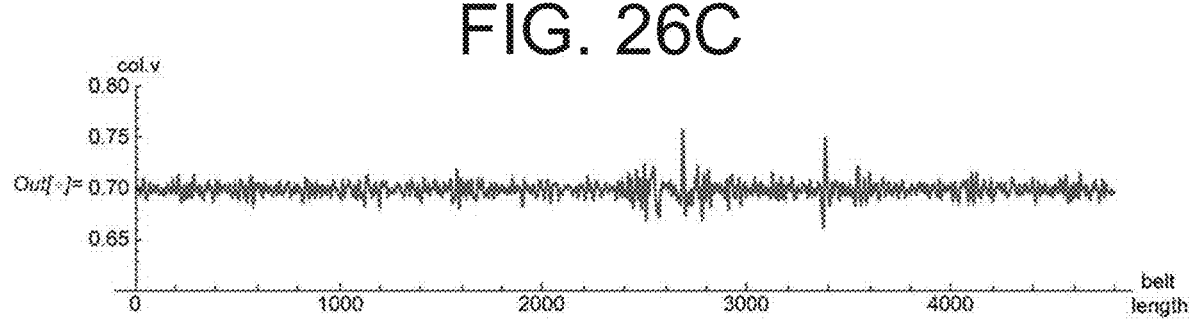
FIG. 26C is a graph illustrating an example of the average value of color values in each line of the belt image when the temporary correction angle is −1.70° during the inclination angle specifying step illustrated in FIG. 25.
Figure 26D:
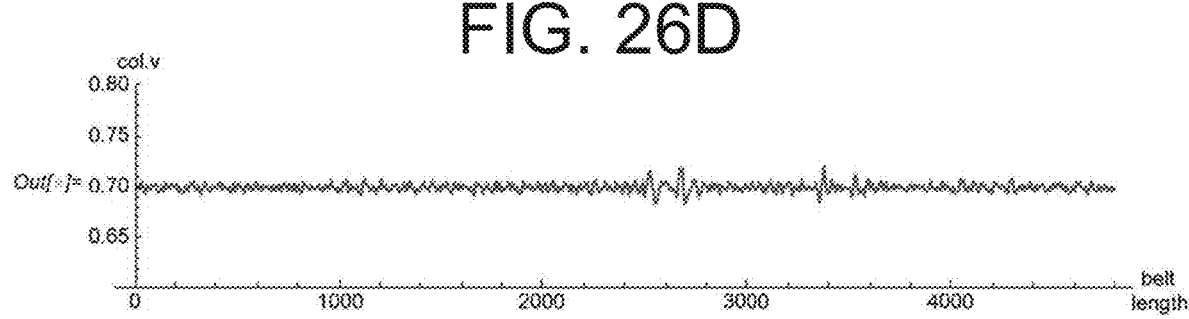
FIG. 26D is a graph illustrating an example of the average value of color values in each line of the belt image when the temporary correction angle is −2.55° during the inclination angle specifying step illustrated in FIG. 25.

FIG. 26A is a graph illustrating an example of the average value of the color values in each line of the belt image when the temporary correction angle is 0.00°. FIG. 26B is a graph illustrating an example of the average value of the color values in each line of the belt image when the temporary correction angle is −0.85°. FIG. 26C is a graph illustrating an example of the average value of the color values in each line of the belt image when the temporary correction angle is −1.70°. FIG. 26D is a graph illustrating an example of the average value of the color values in each line of the belt image when the temporary correction angle is −2.55°.

In the example illustrated in FIGS. 26A to 26D, the inclination angle of the belt portion in the belt image is assumed to be −1.70°.

As illustrated in FIG. 26A, when the temporary correction angle is 0.00°, that is, when substantially no shear deformation is executed at S242, there is almost no difference between the average values of the color values in the lines of the belt image. As illustrated in FIG. 26B, when the temporary correction angle is −0.85°, that is, when the amount of shear deformation at S242 is insufficient, the difference value between the maximum value and the minimum value of the average value of the color values of the pixels in each line of the belt image is large as compared with that illustrated in FIG. 26A but is not the maximum. As illustrated in FIG. 26C, when the temporary correction angle is −1.70°, that is, when the amount of shear deformation at S242 is optimal, the difference value between the maximum value and the minimum value of the average value of the color values of the pixels in each line of the belt image is large as compared with that illustrated in FIG. 26B and is the maximum. As illustrated in FIG. 26D, when the temporary correction angle is −2.55°, that is, when the amount of shear deformation at S242 is excessive, the difference value between the maximum value and the minimum value of the average value of the color values of the pixels in each line of the belt image is large as compared with that illustrated in FIG. 26A but is not the maximum.

During the inclination angle specifying step illustrated in FIG. 25, the defect candidate detecting processor 35a calculates the average value of the color values of the pixels in each line of the belt image at S243. Alternatively, the defect candidate detecting processor 35a may use the sum of color values of pixels in each line of the belt image instead of the average value of the color values of pixels in each line of the belt image. When the defect candidate detecting processor 35a uses the sum of color values of the pixels in each line of the belt image, slightly higher processing is enabled as the calculation is simpler than that in a case where the average value is used.

During the inclination angle specifying step illustrated in FIG. 25, the defect candidate detecting processor 35a calculates the difference value between the maximum value and the minimum value of the average value of the color values of the pixels in each line at S244, uses the difference value to search for the inclination angle at which the difference value has a maximum, and calculates the corresponding inclination angle as an optimum angle; however, the defect candidate detecting processor 35a may use the variance or the standard deviation of the average value of the color values of the pixels in each line instead of the difference value between the maximum value and the minimum value of the average value of the color values of the pixels in each line. That is, the variance or the standard deviation of the average value of the color values of the pixels in each line may be obtained while the shear angle is gradually changed, and the inclination angle at which the variance or the standard deviation have a maximum may be calculated as an optimum angle.

At the inclination angle specifying step illustrated in FIG. 25, the pitch between the angles included in the specific angle group may be set to, for example, $\frac{1}{10}°$ in a range so as to sufficiently cover an acceptable error in specifying the coordinates of a belt defect.

Because of a small pitch between the angles included in the specific angle group, it is expected to improve the accuracy of the inclination angle specified at S247 but accordingly the calculation time is also required. Therefore, by providing a slightly large pitch between the angles included in the specific angle group and interpolating the grid points formed by the combinations recorded at S245, the temporary correction angle in the combination having the largest difference value between the maximum value and the minimum value of the average value of the color values of the pixels in each line may be estimated. For example, the pitch between the angles included in the specific angle group may be set to ¼°, and the grid points formed by the combinations recorded at S245 may be subjected to interpolation calculation by ½₀°. FIG. 27 is a graph obtained by plotting the difference value between the maximum value and the minimum value of the average value of the color values of the pixels in each line with regard to each temporary correction angle. In FIG. 27, a point indicated by a black circle represents a grid point with a pitch of ¼°, which is included in the specific angle group. In FIG. 27, a point indicated by a white circle represents a point obtained by interpolation calculation conducted on grid points by ½₀°. As illustrated in FIG. 27, it is estimated that the temporary correction angle is −1.70° in the combination in which the difference value between the maximum value and the minimum value of the average value of the color values of the pixels in each line has a maximum.

Typically, as a capturing camera of an examination device is firmly fixed, the inclination angle is constant regardless of an intermediate transfer belt, and in that case, each imaging system of an intermediate transfer belt has a unique inclination angle; therefore, it is necessary to perform the inclination angle specifying step once, not frequently, for each imaging system of the intermediate transfer belt, for example, is not necessary for each intermediate transfer belt. However, this is not the case when the inclination angle changes for each intermediate transfer belt.

The above description is about the method for calculating the inclination angle of the belt portion in the belt image by a computer. Alternatively, an operator may visually measure the inclination angle of the belt portion in the belt image. For example, inclined lines in the shape of a protractor are displayed in an overlaid manner on the screen of the display unit 32, which displays a belt image, so that the operator may visually measure the inclination angle of the belt portion in the belt image. Furthermore, while the belt image is displayed on the screen of the display unit 32, the belt image is gradually sheared and deformed, and when the band-like or streaky noise extending in the width direction of the intermediate transfer belt in the belt image becomes parallel to the edge of the screen of the display unit 32, the shear deformation is stopped by the operator, and thus the corresponding inclination angle may be obtained as the inclination angle of the belt portion in the belt image.

After the inclination angle of the belt portion in the belt image is obtained as described above, the belt image is subjected to shear deformation during the shear deformation step at S222 (see FIG. 24) in accordance with the inclination angle specified at the inclination angle specifying step.

Figure 28A:
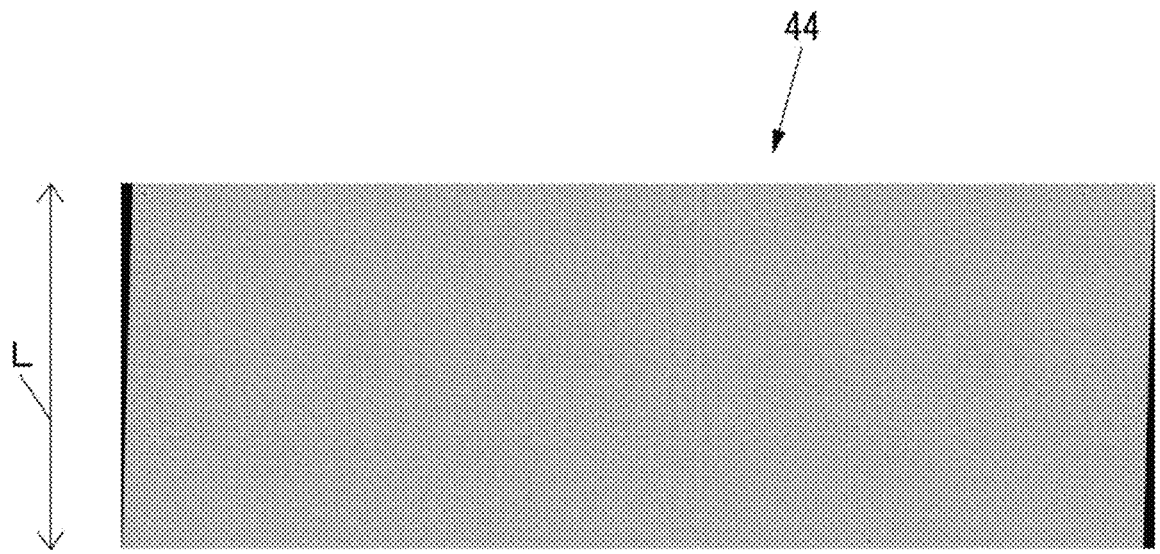
FIG. 28A is a diagram illustrating an example of a belt image obtained by processing the belt image illustrated in FIG. 14 during the shear deformation step.
Figure 28B:
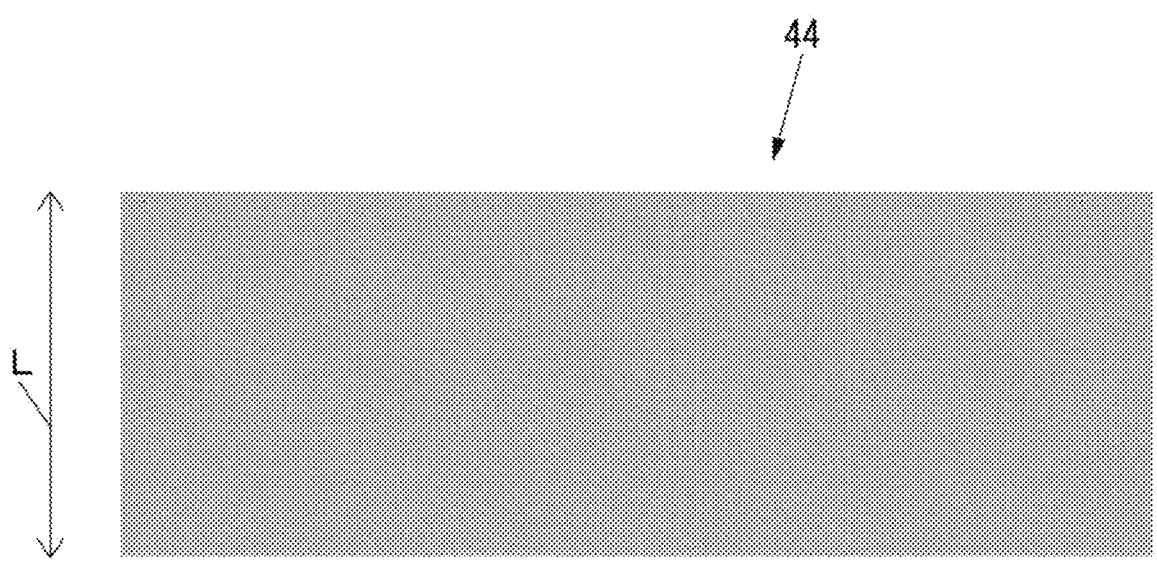
FIG. 28B is a diagram illustrating an example of the belt image obtained by processing the belt image illustrated in FIG. 14 during the shear deformation step, which is different from the example illustrated in FIG. 28A.

FIG. 28A is a diagram illustrating an example of a belt image 44 obtained by processing the belt image 43 illustrated in FIG. 14 during the shear deformation step. FIG. 28B is a diagram illustrating an example of the belt image 44 obtained by processing the belt image 43 illustrated in FIG. 14 during the shear deformation step, which is different from the example illustrated in FIG. 28A.

The belt image 44 illustrated in FIG. 28A is a belt image obtained by padding processing on the difference portion generated from the rectangle by the shear deformation in black. The belt image 44 illustrated in FIG. 28B is a belt image obtained by padding processing on the difference portion generated from the rectangle by the shear deformation in the color of the average color value of the belt portion. The shear deformation step at S222 makes it possible to obtain the belt image similar to the belt image captured in a state where the imaging device is accurately installed as it is supposed to be, that is, in a state with a straight view from the front, as illustrated in FIGS. 28A and 28B.

As illustrated in FIG. 8, when the belt image similar to the belt image captured in a state with a straight view from the front is obtained during the shear deformation correction step at S143, the band-like noise removal step at S144 is executed to remove a band-like or streaky noise extending in the width direction of the intermediate transfer belt.

Figure 29:
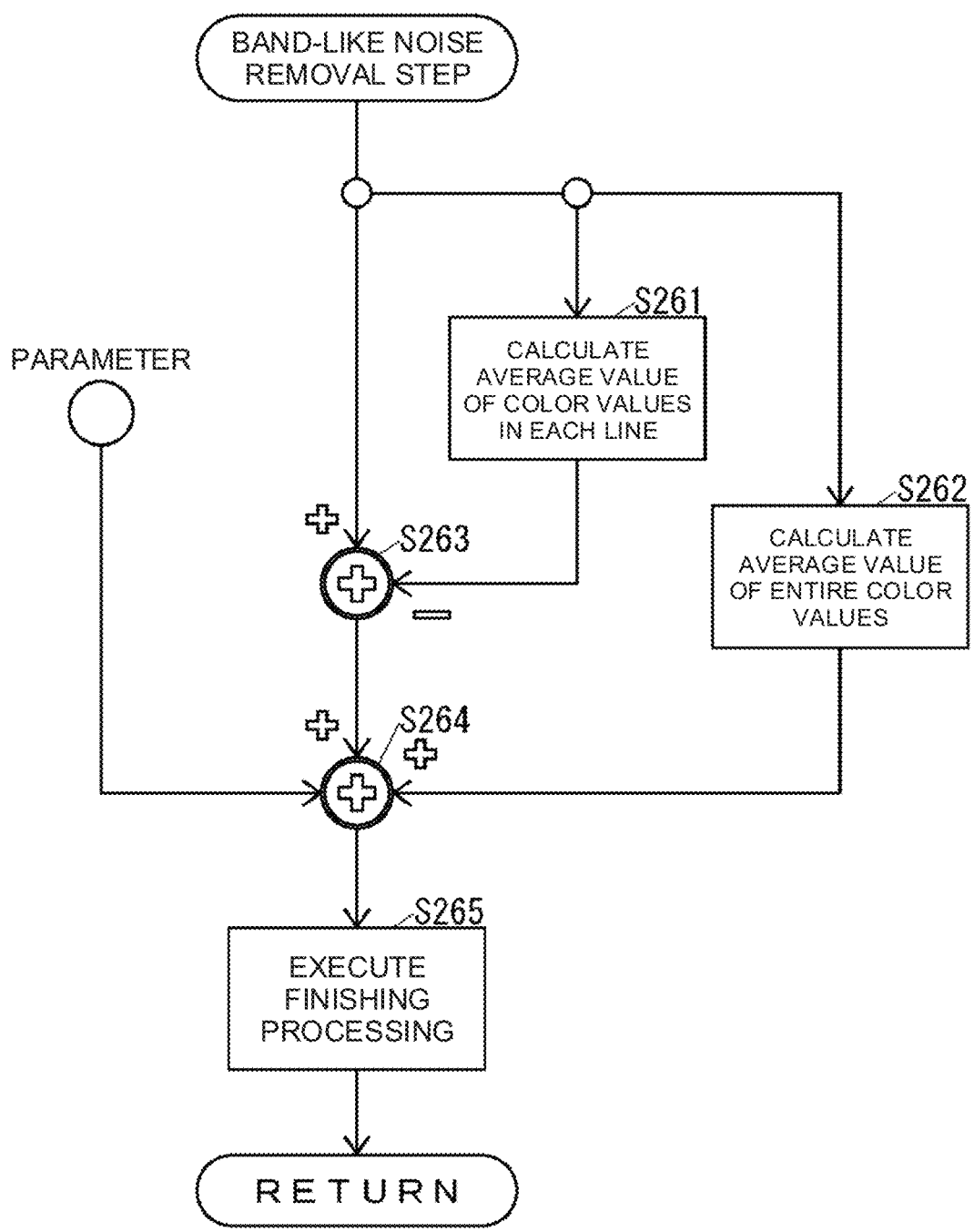
FIG. 29 is a flowchart of a band-like noise removal step illustrated in FIG. 8.

FIG. 29 is a flowchart of the band-like noise removal step illustrated in FIG. 8.

As illustrated in FIG. 29, the defect candidate detecting processor 35a calculates the average value of the color values in each line of the belt image obtained during the shear deformation correction step at S143 (S261). Here, with regard to each line of the belt image obtained during the shear deformation correction step at S143, the defect candidate detecting processor 35a calculates the sum of the color values of all the pixels belonging to the corresponding line. The average value of the color values in each line may be calculated by dividing the sum by the number of all the pixels belonging to the corresponding line, or the average value of the color values in each line may be calculated by a technique other than simple averaging, e.g., by calculating the geometric mean with regard to the color values of all the pixels belonging thereto.

The defect candidate detecting processor 35a calculates the average value of the color values of the entire belt image obtained during the shear deformation correction step at S143 together with the process at S261 (S262).

After the process at S261, with regard to all the lines of the belt image obtained during the shear deformation correction step at S143, the defect candidate detecting processor 35a subtracts the average value of the color values of the corresponding line calculated at S261 from the color value of each pixel of the line (S263). The process at S263 reduces the gap between the lines of the belt image and, for example, eliminates or suppresses a band-like noise or a streaky noise over the entire width of the intermediate transfer belt.

After the processes at S262 and S263, the defect candidate detecting processor 35a adds the average value of the color values of the belt image calculated at S262 to the color value of each pixel of each line of the belt image obtained at S263 (S264). During the process at S264, the reference color value, i.e., the average value of the color values calculated at S262 is applied to each pixel of the belt image. In order to obtain the color value that facilitates processing at subsequent steps, the defect candidate detecting processor 35a may slightly increase or decrease the color value of the belt image, apply a specified color value offset, or perform a contrast operation or a gamma characteristic operation on the belt image. Parameters for these processes are previously set. When a contrast operation or a gamma characteristic operation is executed, the contrast value or the gamma value is not usually manipulated. That is, a linear gamma value of 1.0 is applied and is often left as it is.

After the process at S264, the defect candidate detecting processor 35a executes finishing processing such as fine adjustment of the color value of the belt image or format conversion from a group of color values of the belt image to an image (S265) and ends the band-like noise removal step illustrated in FIG. 29.

Figure 30:
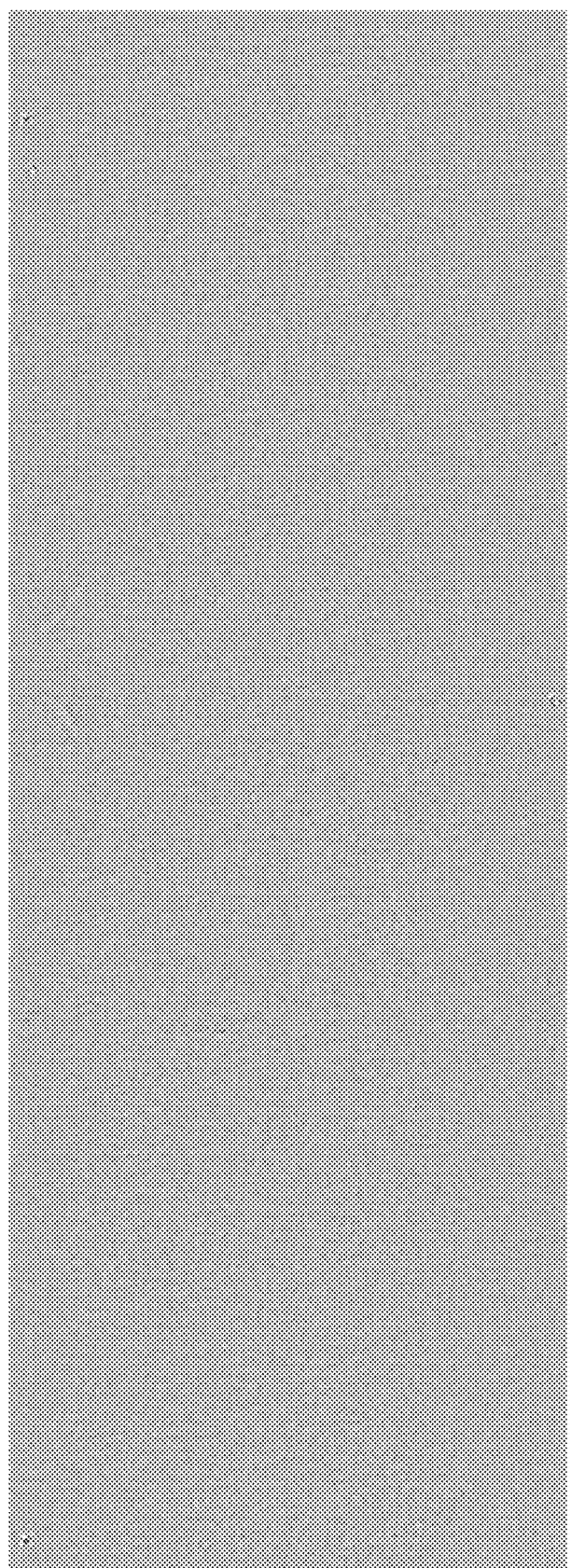
FIG. 30 is a diagram illustrating an example of a belt image obtained by processing the belt image illustrated in FIG. 28B during the band-like noise removal step.

FIG. 30 is a diagram illustrating an example of a belt image 45 obtained by processing the belt image 44 illustrated in FIG. 28B during the band-like noise removal step.

It can be understood that the band-like or streaky noise present in the belt image 44 illustrated in FIG. 28B has been removed from the belt image 45 illustrated in FIG. 30.

In some cases, the belt image obtained during the band-like noise removal step at S144 still includes a texture-pattern like background noise over the entire surface. There is a possibility that this background noise is improperly detected as a candidate for a belt defect during the defect candidate detection step at S122. Therefore, as illustrated in FIG. 8, after the belt image from which a band-like or streaky noise has been removed is obtained during the band-like noise removal step at S144, the background pattern reduction step is executed at S145 to reduce the effect of the texture-pattern like background noise on the belt image.

Figure 31:
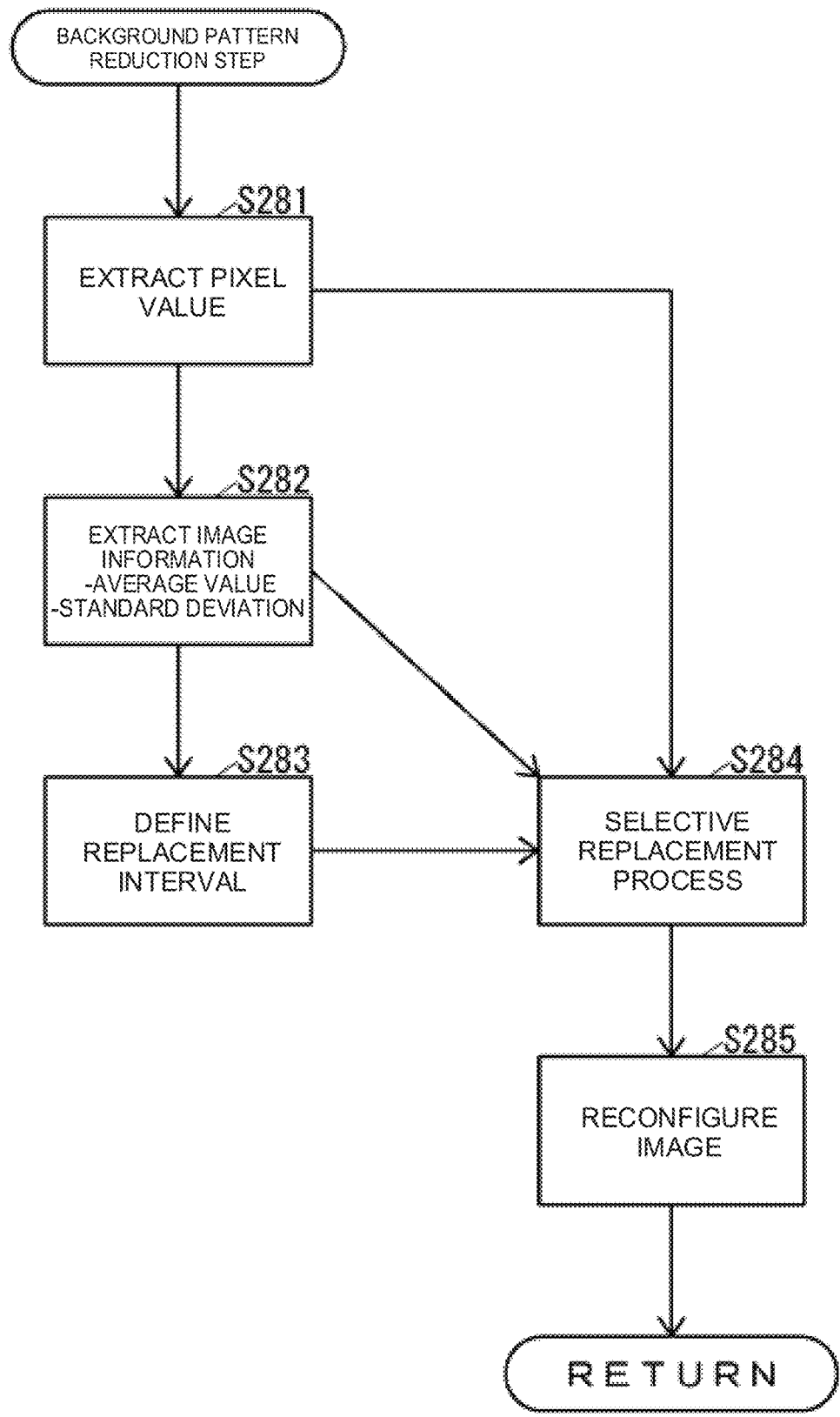
FIG. 31 is a flowchart of a background pattern reduction step illustrated in FIG. 8.

FIG. 31 is a flowchart of the background pattern reduction step illustrated in FIG. 8.

As illustrated in FIG. 31, the defect candidate detecting processor 35a extracts each of pixel values constituting the belt image obtained during the band-like noise removal step at S144 (S281). Here, when each pixel value of the belt image has been already extracted at a step before S281, the defect candidate detecting processor 35a may use the pixel value.

After the process at S281, the defect candidate detecting processor 35a converts each pixel value extracted at S281 into a color value and calculates an average value m and a standard deviation σ of the color values of all the pixels of the belt image (S282). The average value m may be the average value of the color values of some pixels of the belt image. For example, the defect candidate detecting processor 35a may sort the color values of all the pixels of the belt image, trim and remove about the specified amounts (e.g., 5 to 10%) of color values at the top and bottom of the color values of all the pixels of the belt image, and then calculate the average value m based on the remaining color values.

After the process at S282, the defect candidate detecting processor 35a defines a replacement interval for a color value, i.e., a minimal color value L(lo)min on the dark side and a maximum color value L(hi)max on the bright side based on the average value m calculated at S282 (S283). For example, the defect candidate detecting processor 35a uses the average value m, the standard deviation σ, and real coefficients i and j to set the minimal color value L(lo)min and the maximum color value L(hi)max based on the equations below.

$$L(lo)min = m - i*\sigma$$

$$L(hi)max = m + j*\sigma$$

The coefficients i and j may be different from each other. The belt examination system 30 may set values input from outside as the coefficients i and j or previously store the values experimentally obtained from the past experimental data and set the stored values as the coefficients i and j. The belt examination system 30 may be configured to set the stored values as the coefficients i and j by default and properly select either the stored values or the values appropriately input from outside to be set as the coefficients i and j.

After the process at S283, the defect candidate detecting processor 35a executes a selective replacement process to selectively replace the color value of each pixel of the belt image obtained during the band-like noise removal step at S144 (S284). Here, the defect candidate detecting processor 35a determines whether the color value of each pixel extracted at S281 falls within the replacement interval defined at S283. Then, the defect candidate detecting processor 35a replaces the color value of only a pixel which has a color value within the replacement interval defined at S283 with the average value m calculated at S282.

After the process at S284, the defect candidate detecting processor 35a resynthesizes the group of pixels having undergone the selective replacement process at S284 into a belt image (S285), and then the background pattern reduction step illustrated in FIG. 31 ends.

Typically, the portion of a belt defect in a belt image often has an extremely lower or higher color value than the average value. Therefore, in most cases, the difference between the color value of the portion of the belt defect in the belt image and the average value of the color values of the belt image is more than the three to six standard deviations σ. On the other hand, most of the color value variations of a portion other than the belt defect in the belt image, i.e., the normal portion of the intermediate transfer belt, is less than the three standard deviations σ with respect to the average value. During the background pattern reduction step illustrated in FIG. 31, while the color value of the portion of the belt defect in the belt image is maintained as it is, the color value of the normal portion in the belt image is replaced with the average value of the color values of the belt image, whereby it is possible to reduce the possibility that the normal portion in the belt image is improperly detected as a candidate for a belt defect during the defect candidate detection step at S122. By reducing the improper detection during the defect candidate detection step at S122, it is possible to reduce the possibility of improper acceptance/rejection determination during the acceptance/rejection determination step at S123.

Figure 32:
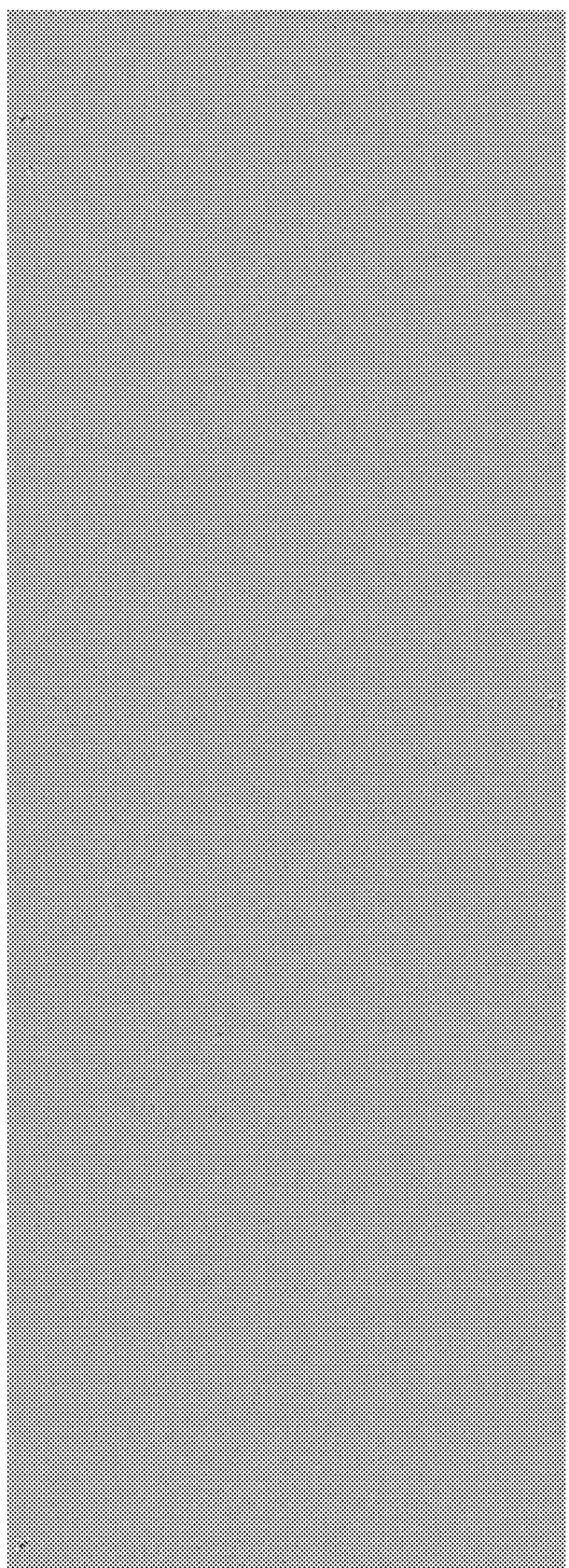
FIG. 32 is a diagram illustrating an example of a belt image obtained by processing the belt image illustrated in FIG. 30 during the background pattern reduction step.
Figure 33:
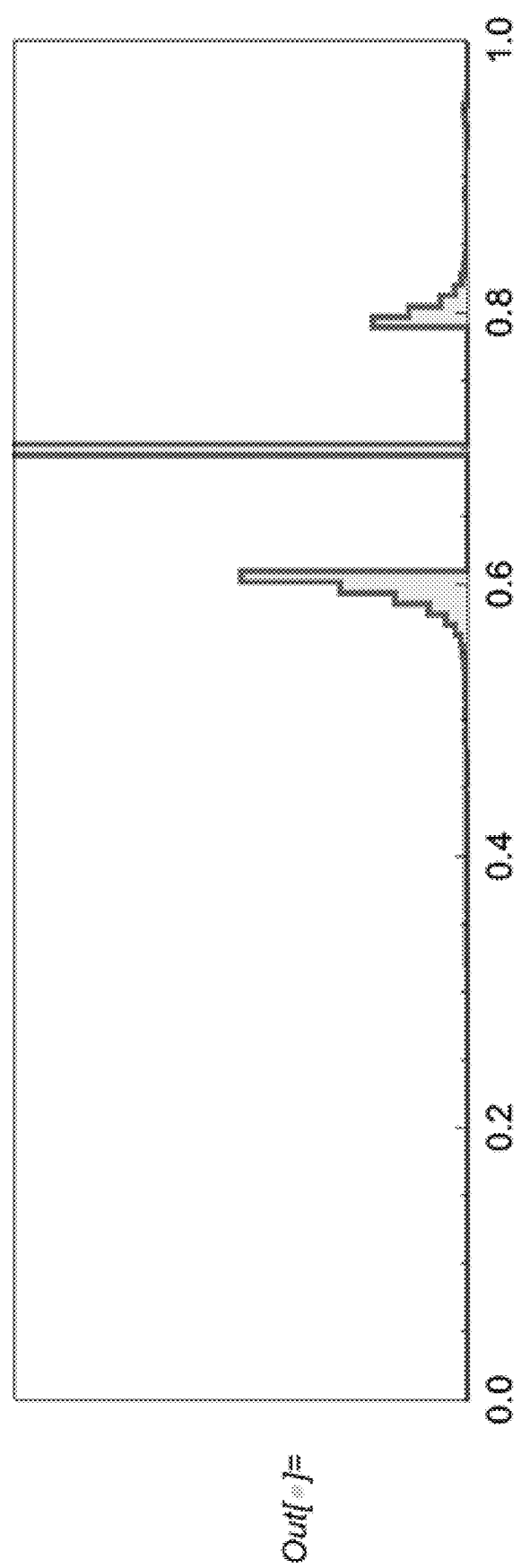
FIG. 33 is a graph illustrating a histogram distribution of color values of the belt image illustrated in FIG. 32.

FIG. 32 is a diagram illustrating an example of a belt image 46 obtained by processing the belt image 45 illustrated in FIG. 30 during the background pattern reduction step at S145. FIG. 33 is a graph illustrating a histogram distribution of the color values of the belt image 46.

It can be understood that the background noise present in the belt image 45 illustrated in FIG. 30 has been removed from the belt image 46 illustrated in FIG. 32.

As illustrated in FIG. 7, the defect candidate detecting processor 35a executes the defect candidate detection step at S122 after the preprocessing step at S121 ends. Specifically, the defect candidate detecting processor 35a uses the image of a typical belt defect as a template to calculate the image correlation degree from the belt image preprocessed during the preprocessing step at S121 so as to detect a candidate for a belt defect from the belt image. For example, the sliding window algorithm or the selective search algorithm may be used; when the sliding window algorithm is used, the sum of differences between the corresponding pixel values in the template image and the belt image is calculated while the template image is slid and is normalized in the output range, the coordinates less than a prescribed threshold are detected, and basically the position thereof is a candidate for a belt defect. The coordinates less than the specified threshold are rarely a single pixel in most cases and extend to multiple pixels in the neighborhood. That is, the region has a certain area. Further, the area becomes larger as the portion has a higher correlation with the template image, and in that case, the coordinates of the center of gravity of the region may be calculated and detected as the representative coordinates of the belt defect. When there are multiple candidates for a belt defect in the intermediate transfer belt to be examined, there are multiple highly correlated regions, and therefore the center of gravity of each region is calculated and detected as the coordinates of each belt defect.

During the defect candidate detection step at S122, the threshold for detecting a candidate for a belt defect is basically the value identical to the threshold during the defect candidate detection step at S302 described below. When there is a need to avoid the failure to detect a candidate for a belt defect, a slightly low threshold may be set to reduce the probability of the detection failure.

After the defect candidate detection step at S122 ends, the acceptance/rejection determining unit 35b executes the acceptance/rejection determination step at S123. That is, the acceptance/rejection determining unit 35b determines the acceptance/rejection of the candidate for a belt defect detected during the defect candidate detection step at S122 by using the learning model for acceptance/rejection determination.

The acceptance/rejection determining unit 35b ends the acceptance/rejection determination step at S123 to end the image diagnosis step as illustrated in FIG. 7 and ends the image diagnosis step at S102 to end the belt examination step as illustrated in FIG. 1.

Next, a learning model generation step to generate a learning model used during the acceptance/rejection determination step at S123 is described.

FIG. 34 is a flowchart of the learning model generation step to generate a learning model used during the acceptance/rejection determination step at S123.

As illustrated in FIG. 34, the learning model generation step includes a preprocessing step (S301) to execute preprocessing on a belt image so as to detect a candidate for a belt defect, a defect candidate detection step (S302) to detect a candidate for a belt defect based on the belt image having undergone the preprocessing during the preprocessing step at S301, a tagging step (S303) to attach an acceptance/rejection tag to the candidate for a belt defect detected during the defect candidate detection step at S302, and a learning model generation step (S304) to generate a learning model for acceptance/rejection determination.

Although the preprocessing step at S301 and the defect candidate detection step at S302 illustrated in FIG. 34 are identical to the preprocessing step at S121 and the defect candidate detection step at S122 illustrated in FIG. 7, respectively, the preprocessing step at S301 and the defect candidate detection step at S302 are performed on multiple intermediate transfer belts, unlike the preprocessing step at S121 and the defect candidate detection step at S122.

During the defect candidate detection step at S302, defect candidates include a mix of a defect candidate that is a true defect and a defect candidate that is not a true defect even though it is detected as a defect candidate. Thus, both a too sufficient threshold and an insufficient threshold are inconvenient. Specifically, when it is insufficient, there may be a failure to detect a true defect, and if it is too sufficient, too many defect candidates that are not true defects may be detected, which results in an unnecessary reduction in the processing speed. Therefore, it is important to set an appropriate threshold but, instead of setting the optimum threshold for detecting a candidate for a belt defect extremely strictly by intention, a slightly low threshold is set, i.e., priority is given to detecting the area that appears to be a belt defect as a candidate for a belt defect without fail over detecting efficiently without waste, so that a portion that is not a true defect is also extracted as a candidate. Simultaneously, by setting a low threshold, both a true defect image and a non-defect image for machine learning are collected.

That is, setting a low threshold by intention has an advantage such that the area that appears to be a belt defect is detected as a belt defect and the images of both the area that is not a true belt detect although it is correlated and the area that is a true belt defect may be collected, i.e., both the image of the area that is a true-positive belt defect and the image of the area that is a false-positive belt defect are sufficiently collected.

After the defect candidate detection step at S302 ends, the tagging step at S303 is executed. Specifically, an acceptance/rejection tag is attached to each of many candidates for a belt defect detected from the intermediate transfer belts during the defect candidate detection step at S302. The tag may be attached based on the visual and touch examination results of the intermediate transfer belts by an examiner who has a skill to determine acceptance/rejection of the intermediate transfer belts.

After the tagging step at S303 ends, the learning model generation step at S304 is executed. Specifically, the learning model generating unit 35c generates a learning model for acceptance/rejection determination by machine learning on a candidate for a belt defect attached with an acceptance/rejection tag during the tagging step at S303. As both the image of a true-positive belt defect and the image of a false-positive belt defect are sufficiently obtained during the defect candidate detection step at S302, the learning model capable of appropriately separating a true-positive belt defect and a false-positive belt defect may be generated during the learning model generation step at S304.

The existing algorithms such as Logistic Regression, Random Forest, and Support Vector Machine, may be used during the learning model generation step at S304, and of course a more advanced learning model may be used. However, even simple machine learning is often practically enough to find the boundary between a true-positive belt defect and a false-positive belt defect and determine the belongingness to either a true-positive belt defect or a false-positive belt defect. Simple machine learning is rather convenient for production lines in terms of the learning time and additional learning, and it is also often suitable for production lines in terms of the easiness of parameter adjustment and updating.

As described above, the belt examination system 30 replaces, in the belt image, a color value within a specific range of color values not including the lowest color value of the belt defect with a specific color value within the range (S281 to S285) and detects a candidate for a belt defect based on the belt image obtained by replacing the color value within the specific range of color values with the specific color value, whereby a texture-pattern like background noise present in the belt image may be reduced and, as a result, the accuracy of detecting a belt defect may be improved.

The belt examination system 30 replaces, in the belt image, a color value within the range based on the standard deviation of the color values of the belt image with a specific color value within the range, whereby a texture-pattern like background noise having a color value higher than the lowest color value of the belt defect may be effectively reduced and, as a result, the accuracy of detecting a belt defect may be improved. The range of color values to be replaced with the specific color value does not need to be based on the standard deviation of color values of the belt image. For example, the range of color values to be replaced with the specific color value may be a fixed range that does not depend on the belt image.

The belt examination system 30 replaces, in the belt image, a color value within the specific range of color values with the average value of the color values of the belt image, whereby a texture-pattern like background noise having a color value higher than the lowest color value of the belt defect may be effectively reduced and, as a result, the accuracy of detecting a belt defect may be improved. The specific color value with which a color value within the specific range of color values is replaced does not need to be the average value of the color values of the belt image. For example, the specific color value with which a color value within the specific range of color values is replaced may be a fixed color value that does not depend on the belt image.

As the belt examination system 30 specifies the inclination angle of the belt portion in the belt image (S221), it may be easier to specify the position of the belt defect in the actual intermediate transfer belt based on the coordinate position of the belt defect in the belt portion on the belt image.

As the belt examination system 30 executes shear deformation on the belt image in accordance with the inclination angle of the belt portion in the belt image (S222), the similar belt image may be obtained as in a case where the imaging device, which captures the belt image, is installed parallel to the width direction of the intermediate transfer belt without making adjustment such that the imaging device is installed parallel to the width direction of the intermediate transfer belt even when the intermediate transfer belt on the belt image is sheared and deformed due to the failure to install the imaging device parallel to the width direction of the intermediate transfer belt.

For all the lines of the belt image having undergone shear deformation in accordance with the inclination angle, the belt examination system 30 subtracts the average value of the color values of a line from the color value of each pixel of the line (S263); therefore, the gap between the lines is reduced so that a band-like noise or a streaky noise extending in the width direction of the intermediate transfer belt may be eliminated or suppressed and, as a result, the accuracy detection of belt defects may be improved.

When the average value of the color values of the line to which each pixel belongs is subtracted from the color value of each pixel, the color value becomes substantially 0.0, almost black as an image, which causes undesirable workability. Furthermore, when the color value is substantially 0.0, a negative value is also generated, which is processable by a computer but not displayable as an image or not recognizable as a drawing even though it is displayed, which causes undesirable workability. With the belt examination system 30, however, after the average value of the color values of the line to which each pixel belongs is subtracted from the color value of each pixel (S263), a specific value is applied to the color value of each pixel (S264) so that the workability may be improved. Here, the value applied to the color value of each pixel is, for example, the average value of the entire screen of the intermediate transfer belt or the color value that may be easily visually checked by the examiner, and in that case, for example, when the entire range from black to white is 1.0, gray of approximately 0.7 may be set.

Before the inclination angle specifying process (S221), the belt examination system 30 performs the processes (S201 to S203) to remove, from the belt image, a noise that is equal to or less than a first size smaller than the standard size of a belt defect, such as dark current noise or photon noise, and a noise that is equal to or more than a second size larger than the standard size of a belt defect, such as lens light falloff or in-plane unevenness, and therefore the accuracy of specifying the inclination angle of the belt portion in the belt image may be improved.

As the belt examination system 30 detects a candidate for a belt defect from the belt image from which a noise that is equal to or less than the first size smaller than the standard size of a belt defect, such as dark current noise or photon noise, and a noise that is equal to or more than the second size larger than the standard size of a belt defect, such as lens light falloff or in-plane unevenness, have been removed at S201 to S203 (S122 and S302), the accuracy of detecting a candidate for a belt defect may be improved and, as a result, the accuracy of detecting a belt defect may be improved.

Before the background pattern reduction step (S145), the belt examination system 30 performs the processes (S201 to S203) to remove, from the belt image, a noise that is equal to or less than the first size smaller than the standard size of a belt defect, such as dark current noise or photon noise, and a noise that is equal to or more than the second size larger than the standard size of a belt defect, such as lens light falloff or in-plane unevenness; thus, the accuracy of detecting a belt defect may be further improved.

As the belt examination system 30 uses the learning model to determine acceptance/rejection of the quality of the intermediate transfer belt with regard to a candidate for a belt defect, the detection accuracy of which has been improved (S123), the accuracy of determining acceptance/rejection of the quality of the intermediate transfer belt may be improved.

As the belt examination system 30 generates the learning model for determining acceptance/rejection of the quality of the intermediate transfer belt by using candidates for a belt defect, the detection accuracy of which has been improved (S304), the accuracy of determining acceptance/rejection of the quality of the intermediate transfer belt may be improved.

What is claimed is:

1. A belt examination system comprising a defect candidate detecting processor that detects a candidate for a belt defect that is an abnormal portion of an intermediate transfer belt of an image forming apparatus from a belt image that is an image of the intermediate transfer belt, wherein
   the defect candidate detecting processor
      executes a background pattern reduction step to reduce a texture-pattern like background noise present in the belt image, and
      detects the candidate based on the belt image generated during the background pattern reduction step, and
   the background pattern reduction step is to replace, in the belt image, a color value within a specific range of color values not including a lowest color value of the belt defect with a specific color value within the specific range.

2. The belt examination system according to claim 1, wherein the specific range is based on a standard deviation of color values of the belt image.

3. The belt examination system according to claim 1, wherein the specific color value is an average value of color values of the belt image.

4. The belt examination system according to claim 1, wherein the defect candidate detecting processor performs, before the background pattern reduction step, a process to remove, from the belt image, both a noise that is equal to or less than a first size smaller than a standard size of the belt defect and a noise that is equal to or more than a second size larger than the standard size.

5. The belt examination system according to claim 1, wherein
the defect candidate detecting processor performs an inclination angle specifying process to
temporarily shear and deform the belt image at a temporary correction angle,
calculate either an average value or a sum of color values in each line of the temporarily sheared and deformed belt image,
calculate any of a difference value between a maximum value and a minimum value, a variance, and a standard deviation of either the average value or the sum calculated in all the lines of the belt image, and
specify the temporary correction angle at which any of the difference value between the maximum value and the minimum value, the variance, and the standard deviation has a maximum among the temporary correction angles as an inclination angle of a portion of the intermediate transfer belt in the belt image,
the defect candidate detecting processor executes shear deformation on the belt image in accordance with the inclination angle specified during the inclination angle specifying process, and
before the background pattern reduction step, the defect candidate detecting processor subtracts an average value of color values in each line from a color value of each pixel in the line among all the lines of the belt image having undergone the shear deformation in accordance with the inclination angle.

6. The belt examination system according to claim 1, further comprising an acceptance/rejection determining unit that uses a learning model to determine acceptance/rejection of a quality of the intermediate transfer belt with regard to the candidate detected by the defect candidate detecting processor.

7. The belt examination system according to claim 6, further comprising a learning model generating unit that generates the learning model by using the candidate detected by the defect candidate detecting processor.

8. A computer-readable non-transitory recording medium having stored thereon a belt examination program causing a computer to implement a defect candidate detecting processor that detects a candidate for a belt defect that is an abnormal portion of an intermediate transfer belt of an image forming apparatus from a belt image that is an image of the intermediate transfer belt, wherein
the defect candidate detecting processor
executes a background pattern reduction step to reduce a texture-pattern like background noise present in the belt image, and
detects the candidate based on the belt image generated during the background pattern reduction step, and
the background pattern reduction step is to replace, in the belt image, a color value within a specific range of color values not including a lowest color value of the belt defect with a specific color value within the specific range.

* * * * *